US011795399B2

(12) United States Patent
Arasi et al.

(10) Patent No.: US 11,795,399 B2
(45) Date of Patent: Oct. 24, 2023

(54) UV CURABLE ADHESION PROMOTERS BASED ON FUNCTIONALISED POLYVINYL ALCOHOLS

(71) Applicant: MERCK PATENT GMBH, Darmstadt (DE)

(72) Inventors: Hassan Arasi, Eastleigh (GB); Kevin Adlem, Bournemouth (GB); Stephen Mulcahy, Southampton (GB); Iain Gardiner, Chandlers Ford (GB)

(73) Assignee: MERCK PATENT GMBH, Darmstadt (DE)

( * ) Notice: Subject to any disclaimer, the term of this patent is extended or adjusted under 35 U.S.C. 154(b) by 594 days.

(21) Appl. No.: 16/330,609

(22) PCT Filed: Sep. 4, 2017

(86) PCT No.: PCT/EP2017/072044
§ 371 (c)(1),
(2) Date: Mar. 5, 2019

(87) PCT Pub. No.: WO2018/042026
PCT Pub. Date: Mar. 8, 2018

(65) Prior Publication Data
US 2022/0363992 A1    Nov. 17, 2022

(30) Foreign Application Priority Data

Sep. 5, 2016  (EP) .................... 16187212

(51) Int. Cl.
| G02F 1/1333 | (2006.01) |
| C09K 19/54 | (2006.01) |
| C08F 222/10 | (2006.01) |
| C08F 220/14 | (2006.01) |
| C09K 19/38 | (2006.01) |

(52) U.S. Cl.
CPC .......... C09K 19/542 (2013.01); C08F 220/14 (2013.01); C08F 222/1025 (2020.02); C09K 19/3857 (2013.01); *C08F 2800/10* (2013.01); *C08F 2810/50* (2013.01)

(58) Field of Classification Search
CPC .. C09K 19/542; C09K 19/3857; C09K 19/52; C09K 2019/0448; C09K 2019/3804; C09K 2019/0444; C09K 2219/03; C08F 220/14; C08F 222/1025; C08F 2800/10; C08F 2800/50; G02F 1/1333
See application file for complete search history.

(56) References Cited

U.S. PATENT DOCUMENTS

| 5,631,051 A | 5/1997 | Ito |
| 5,747,121 A | 5/1998 | Okazaki et al. |
| 5,830,953 A | 11/1998 | Nishikawa et al. |
| 6,710,126 B1 | 3/2004 | Hirt et al. |
| 10,106,742 B2 | 10/2018 | Yoon et al. |
| 2012/0169970 A1 | 7/2012 | Fukuda et al. |
| 2016/0185083 A1 | 6/2016 | Yasui et al. |
| 2022/0363992 A1* | 11/2022 | Arasi ................ C09K 19/3857 |

FOREIGN PATENT DOCUMENTS

| EP | 3044289 B1 | 10/2017 | |
| JP | 8338913 A | 12/1996 | |
| JP | 9316127 A | 12/1997 | |
| JP | 2003516810 A | 5/2003 | |
| JP | 2009221284 A | 10/2009 | |
| JP | 2012177894 A | 9/2012 | |
| JP | 2014055218 A | 3/2014 | |
| JP | 2016138941 * | 8/2016 | ......... G02F 1/13363 |
| TW | 201629170 A | 8/2016 | |
| TW | 201631088 A | 9/2016 | |
| WO | 0144307 A2 | 6/2001 | |
| WO | 05005573 A1 | 1/2005 | |
| WO | 15036072 A1 | 3/2015 | |

OTHER PUBLICATIONS

N. R. Charles et al., Synthesis and characterization of photocrosslinkable, degradable poly(vinyl alcohol)-based tissue engineering scaffolds, BIOMATERIALS, Jan. 12, 2002, vol. 23, p. 3617-3626.
Martens Penny et al., Synthesis and characterization of degradable hydrogels formed from acrylate modified poly (vinyl alcohol) macromers, POLYMER, Aug. 13, 2002, vol. 43, p. 6093-6100.
Notification of Reasons for Refusal in corresponding JP 2019-512658 dispatched Sep. 14, 2021 (pp. 1-2).
Cerna, Marcela, Petr Dzik, and Michal Vesely., "Influence of Initiator and Plasticizer on Photochemical Cross-linking of Methacrylated Poly (vinyl alcohol).", Journal of Photopolymer Science and Technology, vol. 25, No. 4, Jun. 26, 2012, pp. 415-426.
Alves, Marie-Helene, et al., "Poly (vinyl alcohol) physical hydrogels: new vista on a long serving biomaterial.", Macromolecular bioscience, vol. 11, No. 10, Jul. 25, 2011, pp. 1293-1313.
Office Action in corresponding ROC (Taiwan) Patent Application No. 106130166 dated Mar. 15, 2021 (pp. 1-7).
Nuttelman C R et al: "Synthesis and characterization of photocrosslinkable, degradable poly(vinyl alcohol)-based tissue engineering scaffolds", Biomaterials, Elsevier Science Publishers BV., Barking, GB, vol. 23, No. 17, Sep. 1, 2002 (Sep. 1, 2002), pp. 3617-3626, XP027303694, ISSN: 0142-9612, [retrieved on Sep. 1, 2002].
P. Martens; T. Holland; K. S. Anseth, Polymer, vol. 43, 2002, pp. 6093-6100.
International Search Report PCT/EP2017/07244 dated Nov. 30, 2017 (pp. 1-3).

* cited by examiner

*Primary Examiner* — Geraldina Visconti
(74) *Attorney, Agent, or Firm* — MILLEN WHITE ZELANO AND BRANIGAN, PC; Csaba Henter

(57) ABSTRACT

Suggested are new adhesion promoters, which are particular suitable for use in displays. Its inclusion in the polymerisable LC mixture results in an excellent adhesion on substrate without colouration over time i.e. compared to amino siloxanes. The new additives have no effect on alignment of LC on the substrate while improving the adhesion.

20 Claims, 3 Drawing Sheets

UV CURABLE ADHESION PROMOTERS BASED ON FUNCTIONALISED POLYVINYL ALCOHOLS

FIELD OF INVENTION

The present invention belongs to the area adhesion of promoters based on a functionalized, polymerisable poly vinyl alcohol (PVA), particularly useful for polymerisable LC mixtures, optical films, OLED Displays, LC displays and refers to applications, polymerisable LC mixtures, optical films, laminated structures, OLED displays and LC displays comprising said promoters and a method for fabricating polymerisable LC mixtures, laminated structures or optical films using said promoters.

STATE OF THE ART

Adhesion promoters are compounds capable of providing a physical or chemical binding at the interface of two immiscible compounds. The products are particularly useful in areas where adhesion is subject to mechanical forces or coating is difficult. A major problem is the coating of liquid crystal displays by means of optical films made from polymerizable liquid crystal materials or reactive mesogens (RM) as described for example in EP 3044289 A1 (MERCK).

From the state of the art various adhesion promoters are well known, particularly those based on polyolefins modified by chlorine and maleic acid anhydride or in the alternative made from alkoxysilanes. For example US 2007 0077372 A1 (ROCKWELL) discloses UV-curable adhesion promoters based on aromatic polyimide-based UV-cured acrylates.

Adhesion promoters for RM mixtures for use in +C and +A plate films have high requirements for both optical properties and performance. The most commonly used adhesion promoter is the material known as TEGO ADDID 900 (N-[3-(trimethoxysilyl)propyl]-1,2-ethanediamine).

The yellowing of this type of additives in the chosen mixture compositions is still a major problem. Table A below shows UV-vis data of mixtures containing adhesion promoters in a standard solvent for coating an RMS. The mixtures are heated for 72 h at 70° C. in an accelerated ageing test. After 72 h accelerated testing, the mixtures are measured using UV-vis spectroscopy and the % T at 425 nm is used as an indicator of how yellow the mixture had become.

TABLE A

Transmission data for mixtures in cyclopentanone

| Additive | % T at 425 nm after 72 h |
|---|---|
| [3-(2-Aminoethylamino)propyl]trimethoxysilane | 0 |
| [3-(2-Aminoethylamino) propyl]triethoxysilane | 0.45 |
| 3-aminopropyl trimethoxy silane | 2.05 |
| 3-aminopropyl triethoxy silane | 2.1 |

Another also well-known problem associated with the adhesion promoter additives known from the state of the art is related to the poor alignment and adhesion under "non-perfect" conditions.

For example, during polymerisation certain polymerisable materials, like for example acrylates, suffer polymer shrinkage [cf., for example, R. A. M. Hikmet, B. H. Zwerver and D. J. Broer Polymer (1992), 33, 89]. This shrinkage causes a lot of strain in the polymerised film and reduces the adhesion between the film and the substrate.

Therefore, it has been the object of the present invention to provide new adhesion promoters, particularly useful for the use in optical films, which overcome the specific disadvantages of the state of the art as described above. In particular, the new promoters must not provide a negative effect on the optical film on the substrate when added directly to a polymerizable LC material formulation before curing, but should simultaneously exhibit after curing of the polymerizable LC formulation excellent adhesion of the optical film to the substrate without any colouration of the optical film over time.

Advantageously, the polymerisable LC material for the preparation of a uniform aligned optical film, should
- show favourable adhesion to the substrate,
- do not require the use of separate adhesion layer,
- do not require the use of a separate alignment layer,
- exhibit an uniform homeotropically alignment,
- be highly transparent to VIS-light,
- exhibit an reduced yellow colouration over time and
- show a favourable high temperature stability, especially in view of incell applications.

Other aims of the present invention are immediately evident to the person skilled in the art from the following detailed description.

DESCRIPTION OF THE INVENTION

Figure 1:
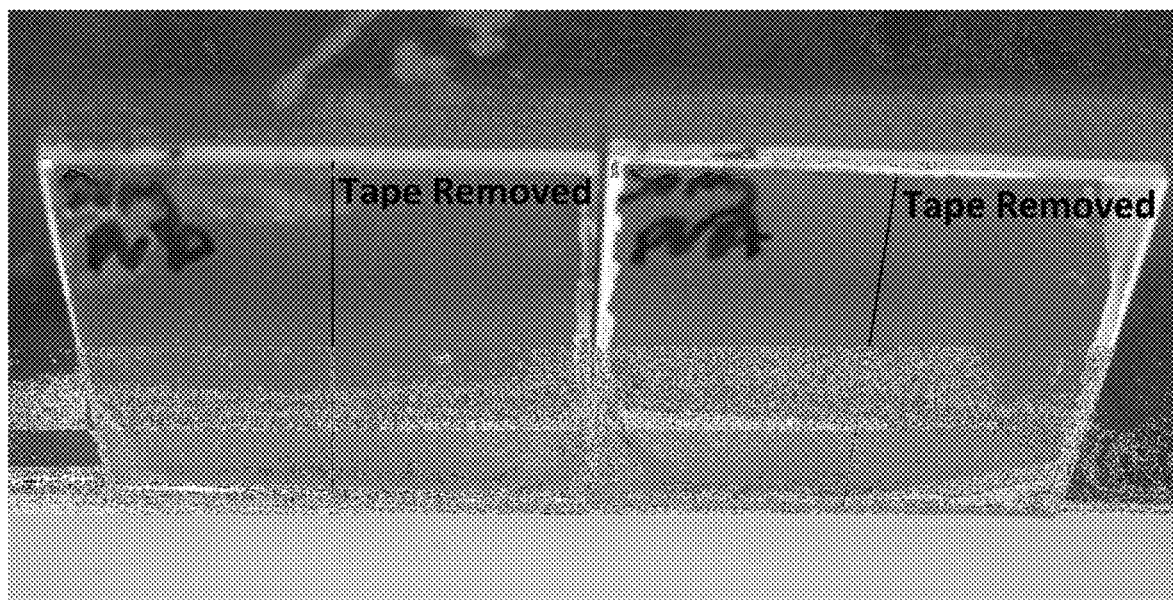
FIG. 1 depicts results from experiment 2.

A first object of the present invention is directed to a polymer comprising, preferably consisting of, one or more of the repeating units A and/or B,

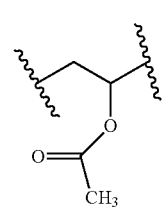

A

B

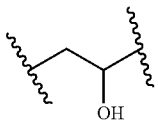

and one or more of the repeating units C and/or D,

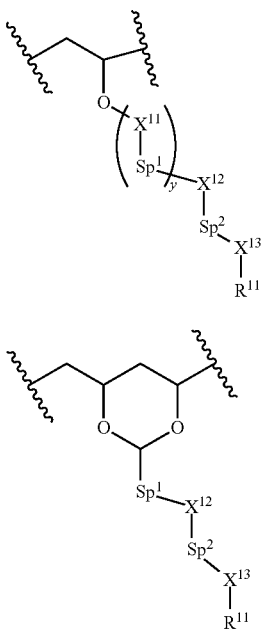

wherein
(a) $Sp^1$ represents a first spacer group comprising or consisting of carbyl or hydrocarbyl group;
(b) $X^{11}$ represents a $CH_2$, CO, —S—CO or —NH—CO— moiety;
(c) y stands for 0 or an integer of from 1 to 10, preferably 3 most preferably 1, in which $Sp^1$ is defined as above, but independently of each other in each occurrence and $X^{11}$ is defined as above but independently of each other in each occurrence;
(d) $X^{12}$ stands for CO, O, N, S or an ester group;
(e) $Sp^2$ represents a second spacer group comprising or consisting of carbyl or hydrocarbyl group;
(f) $X^{13}$ represents O, N or S;
(g) $R^{11}$ stands for a polymerizable group, preferably an epoxide, an acryloyl or methacryloyl group, more preferably an acryloyl and/or methacryloyl group, and most preferably an acryloyl group.

Above and below, "carbyl group" denotes a mono- or polyvalent organic group containing at least one carbon atom which either contains no further atoms (such as, for example, —C≡C—) or optionally contains one or more further atoms, such as, for example, halogen, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, halogen, N, O, S, P, Si, Se, As, Te or Ge.

"Halogen" denotes F, Cl, Br or I, preferably F.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Above and below, the terms "alkyl", "aryl", "heteroaryl", etc., also encompass polyvalent groups, for example alkylene, arylene, heteroarylene, etc. The term "aryl" denotes an aromatic carbon group or a group derived therefrom. The term "heteroaryl" denotes "aryl" in accordance with the above definition containing one or more heteroatoms.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S, and Se.

Particular preference is given to mono-, bi-, or tricyclic aryl groups having 6 to 25 C atoms and mono-, bi- or tricyclic heteroaryl groups having 2 to 25 C atoms, which optionally contain fused rings and which are optionally substituted. Preference is furthermore given to 5-, 6-, or 7-membered aryl and heteroaryl groups, in which, in addition, one or more CH groups may be replaced by N, S, or O in such a way that O atoms and/or S atoms are not linked directly to one another.

Preferred aryl groups are, for example, phenyl, biphenyl, terphenyl, [1,1':3',1"]-terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc., preferably 1,4-phenyl, 1,3-phenyl, or 1,2-phenyl.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S, and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent CH₂ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbyl, and hydrocarbyl radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —OH, —ON, —NO₂, —NCO, —NCS, —OCN, —SCN, —C(=O)N($R^x$)₂, —C(=O)$Y^1$, —C(=O)$R^x$, —C(=O)O$R^x$, —N($R^x$)₂, in which $R^x$ has the above-mentioned meaning, and $Y^1$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ has the above-mentioned meaning.

Particularly preferred substituents L are, for example, F, Cl, CN, NO₂, CH₃, C₂H₅, OCH₃, OC₂H₅, COCH₃, COC₂H₅, COOCH₃, COOC₂H₅, CF₃, OCF₃, OCHF₂, OC₂F₅, furthermore phenyl.

In the formula shown above and below, a substituted phenylene ring

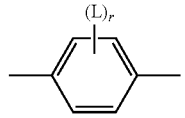

is preferably

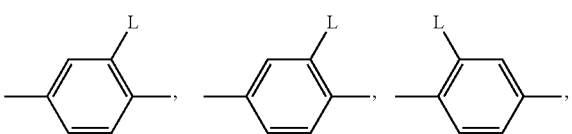

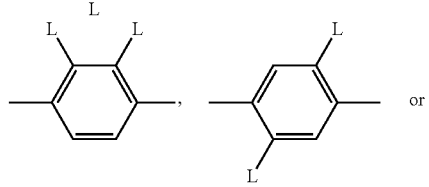

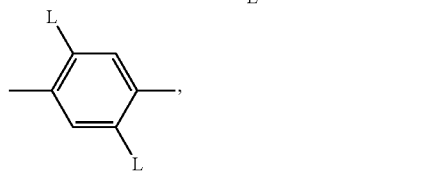

in which L has, on each occurrence identically or differently, one of the meanings given above and below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

Preferably, the polymerizable poly vinyl alcohol (PVA) has molecular weight within the range of about 5,000 to about 205,000 g/mol, more preferably within the range of about 9,000 to 150,000 g/mol.

Preferably the amount of the repeating unit A in the polymer as a whole is in the range from 0 to 80 mol.-%, more preferably in the range from 5 mol.-% to 75 mol.-%, even more preferably in the range from 10 to 70 mol.-%, in particular about 12 mol.-%, about 20 mol.-% or about 22 mol.-%.

Preferably, the amount of the repeating unit B in the polymer as a whole is in the range from 1 mol.-% to 90 mol.-%, more preferably in the range from 10 mol.-% to 80 mol.-%, even more preferably in the range from 25 mol.-% to 50 mol.-%, in particular about 30 mol.-%.

Preferably, the amount of the repeating unit C in the polymer as a whole is in the range from 10 mol.-% to 80 mol.-%, more preferably in the range from 5 mol.-% to 75 mol.-%, even more preferably in the range from 10 to 60 mol.-%, in particular in the range from 10 to 50 mol.-%.

Preferably, the amount of the repeating unit D in the polymer as a whole is in the range from 10 mol.-% to 80 mol.-%, more preferably in the range from 5 mol.-% to 75 mol.-%, even more preferably in the range from 10 to 60 mol.-%, in particular in the range from 10 to 50 mol.-%.

Preferably, the added amounts of the repeating units A, B, C, and D in the polymer as a whole is in the range 70 mol.-% to 100 mol.-%, more preferably more than 95 mol.-%, even more preferably more than 98 mol.-%, especially more than 99 mol.-%, and in particular about 100 mol.-%.

In a preferred embodiment the polymer comprises, preferably consists of, one or more of the repeating units A and/or B and one or more repeating units C and no repeating unit D.

In another preferred embodiment, polymer comprises, preferably consists of, one or more of the repeating units A and/or B, and one or more repeating units D and no repeating unit C.

In a preferred embodiment polymer according to the present invention are derived from commercially available PVA with molecular weights ranging from about 9,000 to about 150,000 g/mol and a degree of hydrolysis between about 30 mol.-% to about 50 mol.-% or about 75 mol.-% to about 90 mol.-%, for example PVA 9-10K 30 mol. % hydrolyzed, PVA 9-10K 80 mol.-% hydrolyzed, PVA 31K 88 mol.-% hydrolyzed, PVA 130K 88 mol.-% hydrolyzed.

Preferably, the following compounds A to N as compiled below correspond to the side chain of the repeating units C in the polymer, which is defined as $$R^{11}-X^{13}-Sp_2-X^{12}-(X^{11}-Sp^1)_y-**$$

Compound A
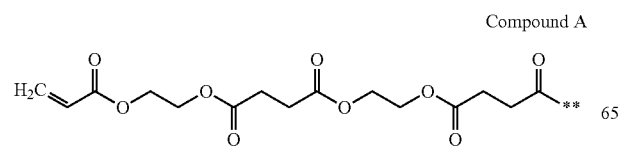

Compound B
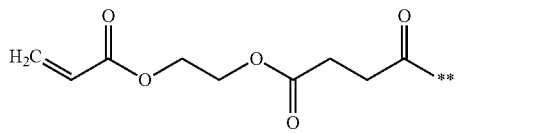

Compound C
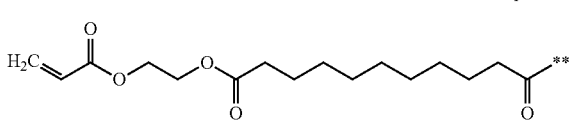

Compound D
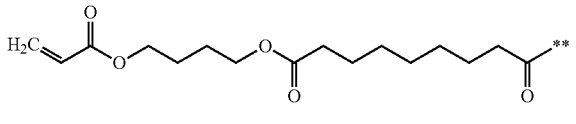

Compound E
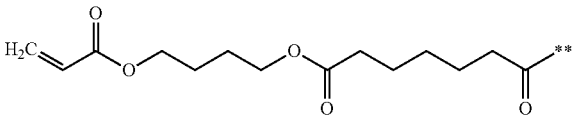

Compound F
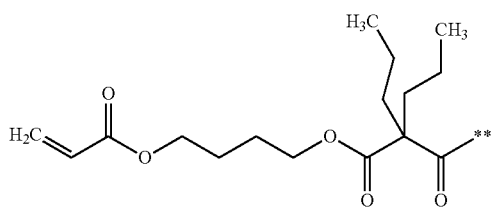

Compound G
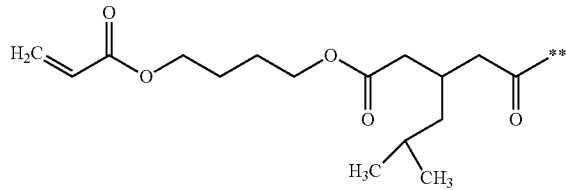

Compound H
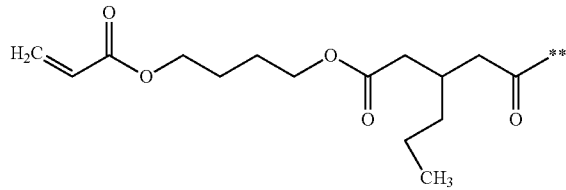

Compound I
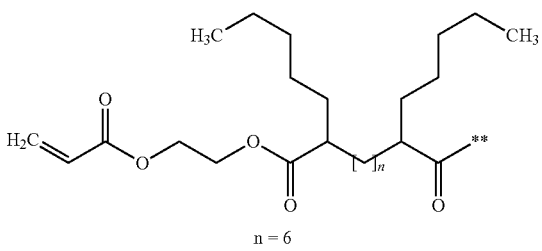

n = 6

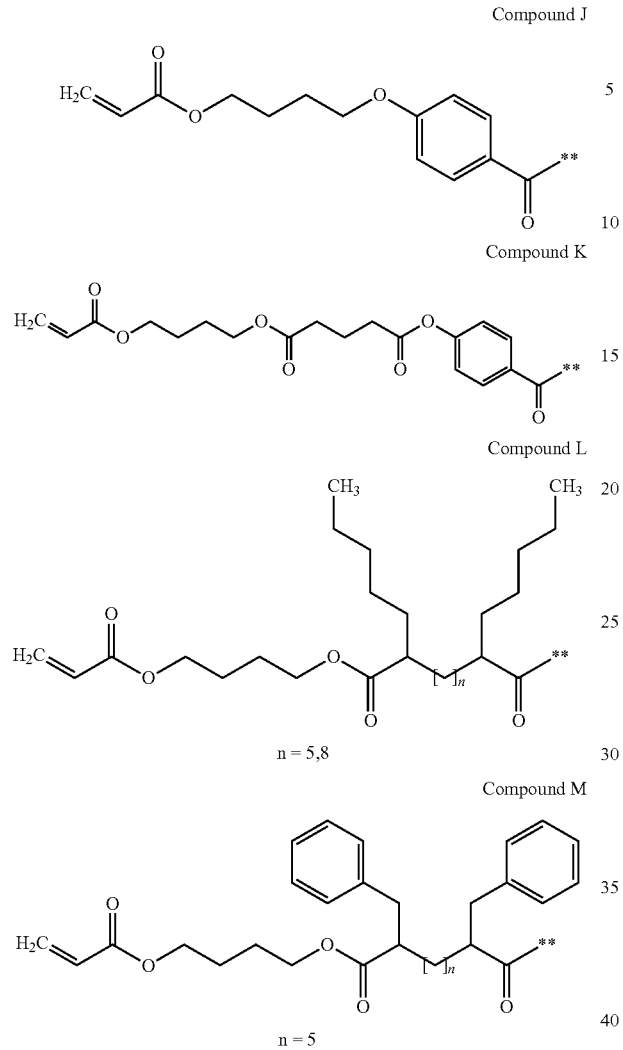

The polymer comprising repeating units C having sidechains according to compound A to M can be prepared by the esterification with the corresponding carboxcylic acid of the compounds A to M with hydrolysed parts (repeating unit B) of the utilized PVA to furnish the corresponding polymer according to the present invention.

In another preferred embodiment, the polymer comprising the repeating units C have sidechains according to compound N,

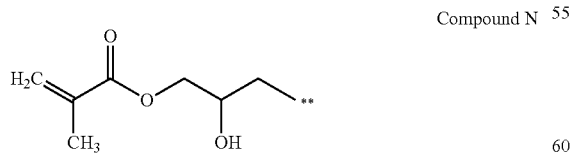

The corresponding polymer can be obtained from the reaction between the hydrolysed parts of the utilized PVA and a corresponding epoxide precursor of compound N, as illustrated below without limiting the scope to that specific illustration:

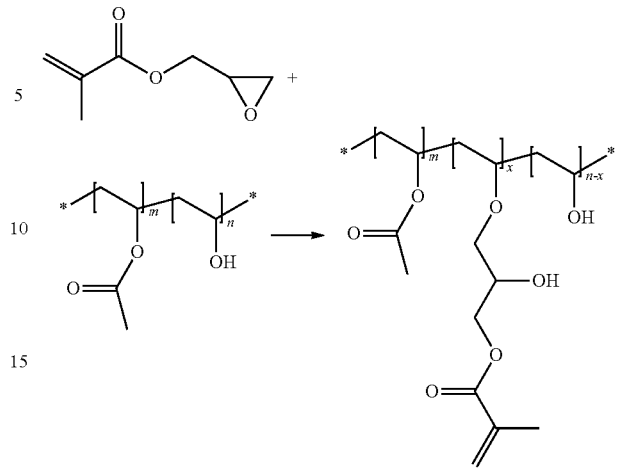

In another preferred embodiment, the polymer comprising the repeating units D having a sidechain $R^{11}$—$X^{13}$-$Sp_2$-$X^{12}$—$(X^{11}$-$Sp^1)_y$—CH (**)$_2$ according to compound O,

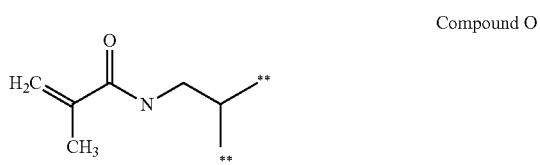

The corresponding polymer can be obtained from a reaction between two hydrolized parts of the utilized PVA and a corresponding dimethyl or diethyl acetal precursor of compound O, as illustrated below without limiting the scope to that specific illustration:

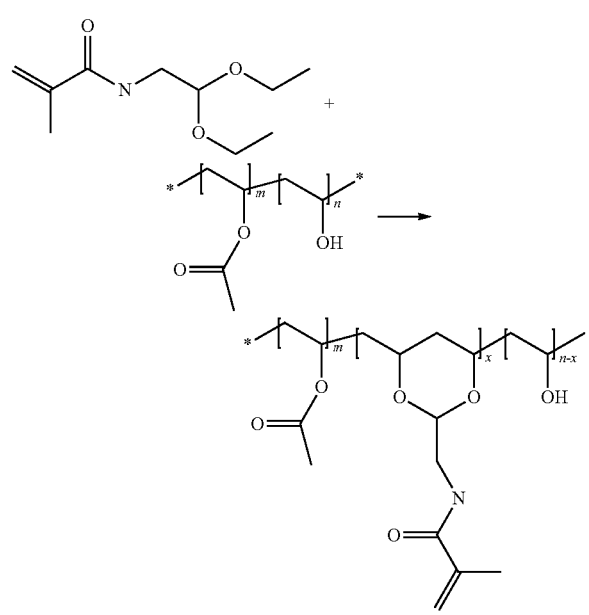

It has been observed that the new polymer according to the present invention do not provide a negative impact on alignment of the polymerizable LC material on the substrate when added directly to said polymerizable LC material before curing, however, the new polymer according to the present invention improve the adhesion and retains good alignment quality of the optical film after curing.

Preferably, the minimum amount of the polymer according to the present invention is 0.1% by weight, in particular 0.5% by weight, most preferably 1% by weight of the whole polymerisable LC material. The maximum amount of the polymer according to the present invention is preferably 10% by weight, very preferably 5% by weight, in particular 3% by weight of the whole polymerisable LC material.

Therefore, the invention further relates to a polymerisable liquid crystal (LC) material, which comprises one or more polymerisable mesogenic compounds and at least one polymer according to the present invention, to a polymer film or optical film obtainable, preferably obtained from the polymerisable LC material, as described above and below and to a method of production of a polymer film, as described above and below.

Suitable polymerisable compounds for the polymerisable LC material according to the present invention are preferably selected from mesogenic or liquid-crystalline compounds. Thus, the polymerisable LC material typically comprises one or more polymerisable chiral or achiral mesogenic or liquid-crystalline compounds.

Preferred polymerisable mono-, di-, or multireactive liquid-crystalline compounds are disclosed for example in WO 93/22397, EP 0 261 712, DE 195 04 224, WO 95/22586, WO 97/00600, GB 2 351 734, U.S. Pat. Nos. 5,518,652, 5,750,051, 5,770,107 and 6,514,578.

The compounds disclosed in these documents, however, are to be regarded merely as examples that shall not limit the scope of this invention.

A suitable polymerisable LC material in accordance with the present invention comprises one or more polymerisable mono-, di-, or multireactive liquid-crystalline compounds, which are preferably selected from the compounds of formula II, P-Sp-MG-R$^0$      II wherein
P is a polymerisable group, preferably an acryl, methacryl, vinyl, vinyloxy, propenyl ether, epoxy, oxetane or styrene group,
Sp is a spacer group or a single bond,
MG is a rod-shaped mesogenic group, which is preferably selected of formula M,
M is -(A$^{21}$-Z$^{21}$)$_k$-A$^{22}$-(Z$^{22}$-A$^{23}$)$_l$-,
A$^{21}$ to A$^{23}$ are in each occurrence independently of one another an aryl-, heteroaryl-, heterocyclic- or alicyclic group optionally being substituted by one or more identical or different groups L, preferably 1,4-cyclohexylene or 1,4-phenylene, 1,4 pyridine, 1,4-pyrimidine, 2,5-thiophene, 2,6-dithieno[3,2-b:2',3'-d]thiophene, 2,7-fluorine, 2,6-naphtalene, 2,7-phenanthrene optionally being substituted by one or more identical or different groups L,
Z$^{21}$ and Z$^{22}$ are in each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond, preferably —COO—, —OCO—, —CO—O—, —O—CO—, —OCH$_2$—, —CH$_2$O—, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond, L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, preferably F, —CN or straight chain or branched alkyl, alkoxy, alkylcarbonyl, alkoxycarbonyl, alkylcarbonyloxy or alkoxycarbonyloxy 1 to 6 C atoms, R$^{xx}$ and R$^{yy}$ independently of each other denote H or alkyl with 1 to 12 C-atoms, R$^0$ is H, alkyl, alkoxy, thioalkyl, alkylcarbonyl, alkoxycarbonyl, alkylcarbonyloxy or alkoxycarbonyloxy with 1 to 20 C atoms more, preferably 1 to 15 C atoms which are optionally fluorinated, or is Y$^0$ or P-Sp-, Y$^0$ is F, Cl, ON, NO$_2$, OCH$_3$, OCN, SCN, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, preferably F, Cl, CN, NO$_2$, OCH$_3$, or mono- oligo- or polyfluorinated alkyl or alkoxy with 1 to 4 C atoms R$^{01}$ and R$^{02}$ each, independently of one another, denote H or alkyl having 1 to 12 C atoms, and Y$^{01}$ and Y$^{02}$ each, independently of one another, denote H, alkyl having 1 to 12 C atoms, aryl, F, Cl, or ON, and k and l are each and independently 0, 1, 2, 3 or 4, preferably 0, 1 or 2, most preferably 1.

The polymerisable group P is preferably selected from groups containing a C=C double bond or C≡C triple bond, and groups which are suitable for polymerisation with ring opening, such as, for example, oxetane or epoxide groups.

Very preferably the polymerisable group P is selected from the group consisting of CH$_2$=CW$^1$—COO—, CH$_2$=CW$^1$—CO—,

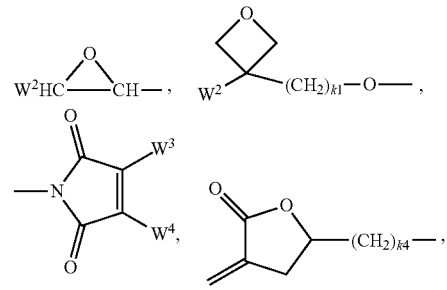

CH$_2$=CW$^2$—(O)$_{k3}$—,      CW$^1$=CH—CO—(O)$_{k3}$—, CW$^1$=CH—CO—NH—,      CH$_2$=CW$^1$—CO—NH—, CH$_3$—CH=CH—O—,      (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—,      CH$_2$=CH—(COO)$_{k1}$-Phe-(O)$_{k2}$—,      CH$_2$=CH—(CO)$_{k1}$-Phe-(O)$_{k2}$—,      Phe-CH=CH—, in which W$^1$ denotes H, F, Cl, CN, CF$_3$, phenyl or alkyl having 1 to 5 C atoms, in particular H, F, Cl or CH$_3$, $W^2$ denotes H or alkyl having 1 to 5 C atoms, in particular H, methyl, ethyl or n-propyl, $W^3$ and $W^4$ each, independently of one another, denote H, Cl or alkyl having 1 to 5 C atoms, Phe denotes 1,4-phenylene, which is optionally substituted by one or more radicals L as being defined above but being different from P-Sp, and $k_1$, $k_2$ and $k_3$ each, independently of one another, denote 0 or 1, $k_3$ preferably denotes 1, and $k_4$ is an integer from 1 to 10.

Particularly preferred groups P are $CH_2\!\!=\!\!CH\!\!-\!\!COO\!\!-\!\!$, $CH_2\!\!=\!\!C(CH_3)\!\!-\!\!COO\!\!-\!\!$, $CH_2\!\!=\!\!CF\!\!-\!\!COO\!\!-\!\!$, $CH_2\!\!=\!\!CH\!\!-\!\!$, $-\!\!CH_2\!\!=\!\!CH\!\!-\!\!O\!\!-\!\!$, $(CH_2\!\!=\!\!CH)_2CH\!\!-\!\!OCO\!\!-\!\!$, $(CH_2\!\!=\!\!CH)_2CH\!\!-\!\!O\!\!-\!\!$,

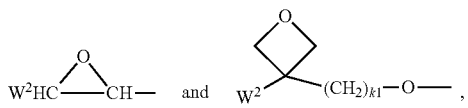

in particular vinyloxy, acrylate, methacrylate, fluoroacrylate, chloroacrylate, oxetane and epoxide, most preferably acrylate or methacrylate.

In a further preferred embodiment of the invention, all polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1. Particular preference is given to multireactive polymerisable radicals selected from the following formulae:

| | |
|---|---|
| $-\!X\text{-alkyl-}CHP^1\!-\!CH_2\!-\!CH_2P^2$ | I*a |
| $-\!X\text{-alkyl-}C(CH_2P^1)(CH_2P^2)\!-\!CH_2P^3$ | I*b |
| $-\!X\text{-alkyl-}CHP^1CHP^2\!-\!CH_2P^3$ | I*c |
| $-\!X\text{-alkyl-}C(CH_2P^1)(CH_2P^2)\!-\!C_{aa}H_{2aa+1}$ | I*d |
| $-\!X\text{-alkyl-}CHP^1\!-\!CH_2P^2$ | I*e |
| $-\!X\text{-alkyl-}CHP^1P^2$ | I*f |
| $-\!X\text{-alkyl-}CP^1P^2\!-\!C_{aa}H_{2aa+1}$ | I*g |
| $-\!X\text{-alkyl-}C(CH_2P^1)(CH_2P^2)\!-\!CH_2OCH_2\!-\!C(CH_2P^3)(CH_2P^4)CH_2P^5$ | I*h |
| $-\!X\text{-alkyl-}CH((CH_2)_{aa}P^1)((CH_2)_{bb}P^2)$ | I*i |
| $-\!X\text{-alkyl-}CHP^1CHP^2\!-\!C_{aa}H_{2aa+1}$ | I*k | in which
alkyl denotes a single bond or straight-chain or branched alkylene having 1 to 12 C atoms, in which one or more non-adjacent $CH_2$ groups may each be replaced, independently of one another, by $-\!C(R^x)\!\!=\!\!C(R^x)\!\!-\!\!$, $-\!C\!\!\equiv\!\!C\!\!-\!\!$, $-\!N(R^x)\!\!-\!\!$, $-\!O\!\!-\!\!$, $-\!S\!\!-\!\!$, $-\!CO\!\!-\!\!$, $-\!CO\!\!-\!\!O\!\!-\!\!$, $-\!O\!\!-\!\!CO\!\!-\!\!$, $-\!O\!\!-\!\!CO\!\!-\!\!O\!\!-\!\!$ in such a way that O and/or S atoms are not linked directly to one another, and in which, in addition, one or more H atoms may be replaced by F, Cl or CN, where $R^x$ has the above-mentioned meaning and preferably denotes $R^0$ as defined above, aa and bb each, independently of one another, denote 0, 1, 2, 3, 4, 5 or 6, X has one of the meanings indicated for X', and $P^{1-5}$ each, independently of one another, have one of the meanings indicated above for P.

Preferred spacer groups Sp are selected from the formula Sp'-X'-, so that the radical "P-Sp-" conforms to the formula "P-Sp'-X'-", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by $-\!O\!\!-\!\!$, $-\!S\!\!-\!\!$, $-\!NH\!\!-\!\!$, $-\!NR^{01}\!\!-\!\!$, $-\!SiR^{01}R^{02}\!\!-\!\!$, $-\!CO\!\!-\!\!$, $-\!COO\!\!-\!\!$, $-\!OCO\!\!-\!\!$, $-\!OCO\!\!-\!\!O\!\!-\!\!$, $-\!S\!\!-\!\!CO\!\!-\!\!$, $-\!CO\!\!-\!\!S\!\!-\!\!$, $-\!NR^{01}\!\!-\!\!CO\!\!-\!\!O\!\!-\!\!$, $-\!O\!\!-\!\!CO\!\!-\!\!NR^{01}\!\!-\!\!$, $-\!NR^{01}\!\!-\!\!CO\!\!-\!\!NR^{01}\!\!-\!\!$, $-\!CH\!\!=\!\!CH\!\!-\!\!$ or $-\!C\!\!\equiv\!\!C\!\!-\!\!$ in such a way that O and/or S atoms are not linked directly to one another, X' denotes $-\!O\!\!-\!\!$, $-\!S\!\!-\!\!$, $-\!CO\!\!-\!\!$, $-\!COO\!\!-\!\!$, $-\!OCO\!\!-\!\!$, $-\!O\!\!-\!\!COO\!\!-\!\!$, $-\!CO\!\!-\!\!NR^{01}\!\!-\!\!$, $-\!NR^{01}\!\!-\!\!CO\!\!-\!\!$, $-\!NR^{01}\!\!-\!\!CO\!\!-\!\!NR^{01}\!\!-\!\!$, $-\!OCH_2\!\!-\!\!$, $-\!CH_2O\!\!-\!\!$, $-\!SCH_2\!\!-\!\!$, $-\!CH_2S\!\!-\!\!$, $-\!CF_2O\!\!-\!\!$, $-\!OCF_2\!\!-\!\!$, $-\!CF_2S\!\!-\!\!$, $-\!SCF_2\!\!-\!\!$, $-\!CF_2CH_2\!\!-\!\!$, $-\!CH_2CF_2\!\!-\!\!$, $-\!CF_2CF_2\!\!-\!\!$, $-\!CH\!\!=\!\!N\!\!-\!\!$, $-\!N\!\!=\!\!CH\!\!-\!\!$, $-\!N\!\!=\!\!N\!\!-\!\!$, $-\!CH\!\!=\!\!CR^{01}\!\!-\!\!$, $-\!CY^{01}\!\!=\!\!CY^{02}\!\!-\!\!$, $-\!C\!\!\equiv\!\!C\!\!-\!\!$, $-\!CH\!\!=\!\!CH\!\!-\!\!COO\!\!-\!\!$, $-\!OCO\!\!-\!\!CH\!\!=\!\!CH\!\!-\!\!$ or a single bond, $R^{01}$ and $R^{02}$ each, independently of one another, denote H or alkyl having 1 to 12 C atoms, and $Y^{01}$ and $Y^{02}$ each, independently of one another, denote H, F, Cl or CN.

X' is preferably $-\!O\!\!-\!\!$, $-\!S\!\!-\!\!$, $-\!CO\!\!-\!\!$, $-\!COO\!\!-\!\!$, $-\!OCO\!\!-\!\!$, $-\!O\!\!-\!\!COO\!\!-\!\!$, $-\!CO\!\!-\!\!NR^0\!\!-\!\!$, $-\!NR^{01}\!\!-\!\!CO\!\!-\!\!$, $-\!NR^{01}\!\!-\!\!CO\!\!-\!\!NR^{01}\!\!-\!\!$ or a single bond.

Typical spacer groups Sp' are, for example, $-\!(CH_2)_{p1}\!\!-\!\!$, $-\!(CH_2CH_2O)_{q1}\!\!-\!\!CH_2CH_2\!\!-\!\!$, $-\!CH_2CH_2\!\!-\!\!S\!\!-\!\!CH_2CH_2\!\!-\!\!$, $-\!CH_2CH_2\!\!-\!\!NH\!\!-\!\!CH_2CH_2\!\!-\!\!$ or $-\!(SiR^{01}R^{02}\!\!-\!\!O)_{p1}\!\!-\!\!$, in which p1 is an integer from 1 to 12, q1 is an integer from 1 to 3, and $R^{01}$ and $R^{02}$ have the above-mentioned meanings.

Particularly preferred groups —X'-Sp'- are $-\!(CH_2)_{p1}\!\!-\!\!$, $-\!O\!\!-\!\!(CH_2)_{p1}\!\!-\!\!$, $-\!OCO\!\!-\!\!(CH_2)_{p1}\!\!-\!\!$, $-\!OCOO\!\!-\!\!(CH_2)_{p1}$.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methylene-oxybutylene, ethylenethioethylene, ethylene-N-methyliminoethylene, 1-methylalkylene, ethenylene, propenylene and butenylene.

Further preferred polymerisable mono-, di-, or multireactive liquid-crystalline compounds are shown in the following list:

II-1

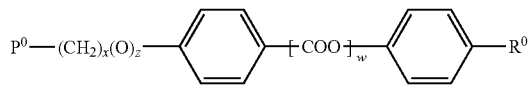

II-2

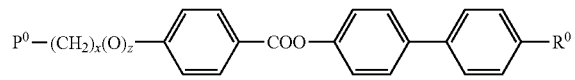

-continued

Structures II-3 through II-21 (chemical structures for polymerizable liquid crystal compounds).

-continued
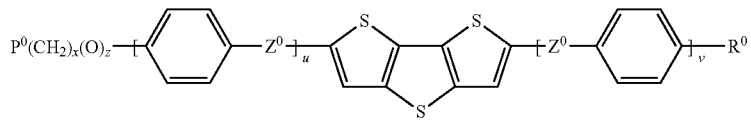
II-22
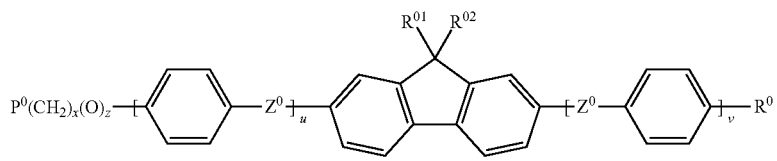
II-23
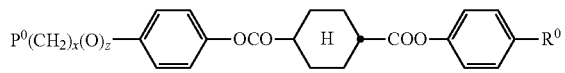
II-24
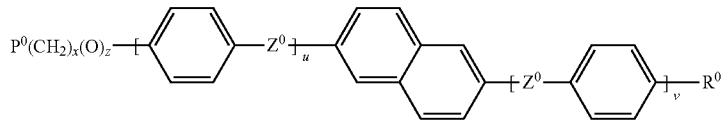
II-25
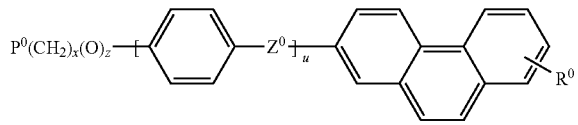
II-26
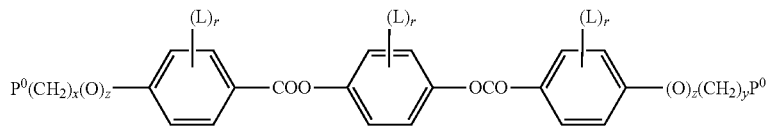
II-27
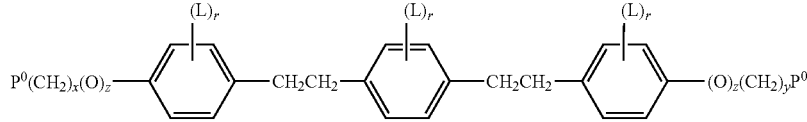
II-28
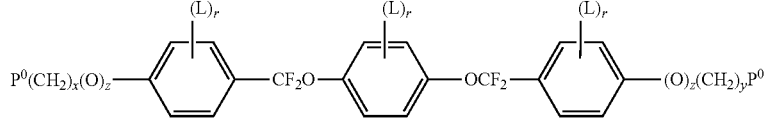
II-29
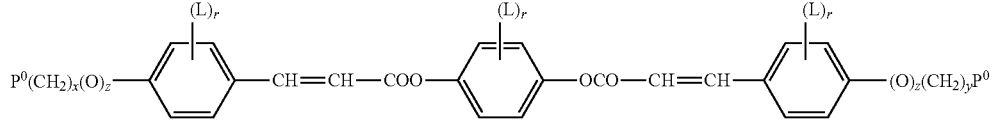
II-30
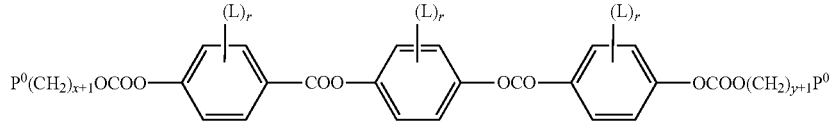
II-31
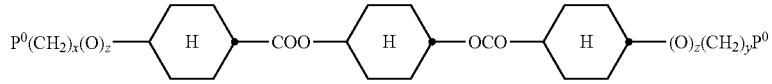
II-32
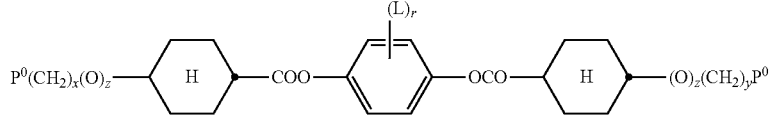
II-33

-continued

II-34

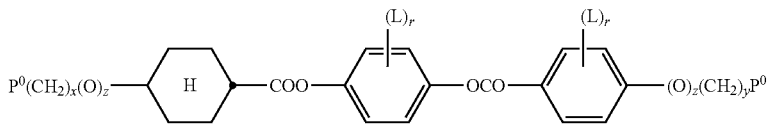

wherein
P⁰ is, in case of multiple occurrence independently of one another, a polymerisable group, preferably an acryl, methacryl, oxetane, epoxy, vinyl, vinyloxy, propenyl ether or styrene group,
A⁰ is, in case of multiple occurrence independently of one another, 1,4-phenylene that is optionally substituted with 1, 2, 3 or 4 groups L, or trans-1,4-cyclohexylene,
Z⁰ is, in case of multiple occurrence independently of one another, —COO—, —OCO—, —CH₂CH₂—, —C≡C—, —CH═CH—, —CH═CH—COO—, —OCO—CH═CH— or a single bond,
r is 0, 1, 2, 3 or 4, preferably 0, 1 or 2,
t is, in case of multiple occurrence independently of one another, 0, 1, 2 or 3,
u and v are independently of each other 0, 1 or 2,
w is 0 or 1,
x and y are independently of each other 0 or identical or different integers from 1 to 12,
z is 0 or 1, with z being 0 if the adjacent x or y is 0,
in addition, wherein the benzene and naphthalene rings can additionally be substituted with one or more identical or different groups L.

The parameter R⁰, Y⁰, R⁰¹, R⁰² and L have the same meanings as given above in formula II.

For the present invention,

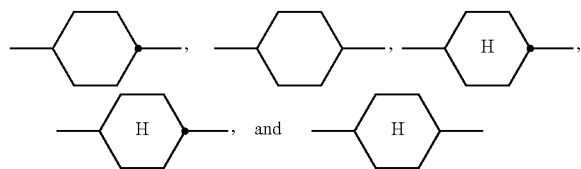

denote 1,4-cyclohexylene, preferably trans-1,4-cyclohexylene, and

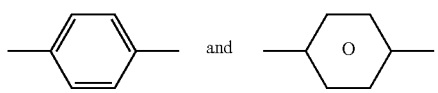

denote 1,4-phenylene.

The proportion of said mono-, di- or multireactive liquid-crystalline compounds in a preferred LC material used for the method according to the present invention as a whole, is preferably in the range from 30 to 99.9% by weight, more preferably in the range from 40 to 99.9% by weight and even more preferably in the range from 50 to 99.9% by weight.

The polymerisable LC material is preferably a mixture comprising one or more polymerisable compounds having one polymerisable group (monoreactive) and one or more polymerisable compound having two or more polymerisable groups (di- or multireactive).

In another preferred embodiment the polymerisable LC material used for the preparation of the low crosslinked film does not contain compounds having more than two polymerisable groups.

In another preferred embodiment the polymerisable LC material used for the preparation of the low cross-linked film is an achiral material, i.e. it does not contain chiral compounds.

The polymerisable compounds and polymerisable mesogenic compounds referred to above and below are preferably monomers.

Another object of the invention is an RM formulation comprising one or more polymer according to the present invention, or comprising an RM mixture, as described above and below, and further comprising one or more solvents and/or further additives.

In a preferred embodiment the RM formulation comprises optionally one or more additives selected from the group consisting of polymerisation initiators, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

In another preferred embodiment the RM formulation comprises one or more solvents, which are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), □-butyrolactone. It is also possible to use binary, ternary or higher mixtures of the above solvents.

In case the RM formulation contains one or more solvents, the total concentration of all solids, including the RMs, in the solvent(s) is preferably from 10 to 60% by weight. Polymerisation of the RMs is preferably carried out in the presence of an initiator absorbing at the wavelength of the actinic radiation. For this purpose, preferably the RM formulation contains one or more polymerisation initiators.

For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure® (Ciba AG). for example Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, or Darcure TPO. In another preferred embodiment, the RM formulation comprises a combination of one or more, more preferably of two or more of such photoinitiators.

A typical cationic photoinitiator is for example UVI 6974 (Union Carbide).

The concentration of the polymerisation initiator(s) as a whole in the RM formulation is preferably from 0.1 to 10% by weight, very preferably from 0.5 to 8% by weight, more preferably 2 to 6% by weight.

Preferably, the polymerisable LC material comprises,
a) one or more mono-, di- or multireactive polymerisable mesogenic compounds,
b) one or more adhesion promoters selected from polymer according to the present invention,
c) one or more photoinitiators,
d) optionally one or more surfactants,
e) optionally one or more stabilizers,
f) optionally one or more mono-, di- or multireactive polymerisable non-mesogenic compounds,
g) optionally one or more dyes showing an absorption maximum at the wavelength used to initiate photo polymerisation,
h) optionally one or more chain transfer agents,
i) optionally one or more stabilizers.

More preferably, the polymerisable LC material comprises,
a) one or more monoreactive polymerisable mesogenic compounds, preferably in an amount of 10 to 95% by weight, very preferably 20 to 75% by weight, preferably selected from the compounds of formulae II-1 and/or II-7,
b) one or more di- or multireactive polymerisable mesogenic compounds, preferably in an amount of 10 to 90% by weight, very preferably 20 to 75% by weight, preferably selected from the compounds of formula II-6 and/or II-7,
c) one or more adhesion promoters, preferably in an amount of 0.1 to 10% by weight, very preferably 0.5 to 5% by weight,
d) optionally one or more photoinitiators, preferably in an amount of 0.1 to 10% by weight, very preferably 0.5 to 8% by weight,
e) optionally one or more surfactants, and
f) optionally one or more stabilizers.

The invention further relates to a method of preparing a polymer film by
providing a layer of a polymerisable LC material as described above and below onto a substrate,
polymerizing the polymerisable LC material, and
optionally removing the polymerised LC material from the substrate and/or optionally providing it onto another substrate.

It is also possible to dissolve the polymerisable LC material or formulation in a suitable solvent as described above. This solution is then coated or printed onto the substrate, for example by spin-coating, printing, or other known techniques, and the solvent is evaporated off before polymerisation. In most cases, it is suitable to heat the mixture in order to facilitate the evaporation of the solvent.

The polymerisable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable plastic substrates are known to the expert and described in the literature, as for example conventional substrates used in the optical films industry. Especially suitable and preferred substrates for polymerisation are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known color filter materials.

The polymer films are preferably prepared from the polymerisable LC material by in-situ polymerisation. In a preferred method of preparation the polymerisable LC material is coated onto a substrate and subsequently polymerised for example by exposure to heat or actinic radiation as described for example in WO 01/20394, GB 2,315,072 or WO 98/04651.

Polymerisation of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerisation is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser.

The curing time is dependent, inter alia, on the reactivity of the polymerisable LC material, the thickness of the coated layer, the type of polymerisation initiator and the power of the UV lamp. The curing time is preferably ≤5 minutes, very preferably ≤3 minutes, most preferably ≤1 minute. For mass production, short curing times of ≤30 seconds are preferred.

A suitable UV radiation power is preferably in the range from 5 to 200 mWcm−2, more preferably in the range from 50 to 175 mWcm$^{-2}$ and most preferably in the range from 100 to 150 mWcm$^{-2}$.

In connection with the applied UV radiation and as a function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

Polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. UV photoinitiators are preferred, in particular radicalic UV photoinitiators.

Polymerisation is preferably performed under an inert gas atmosphere, preferably in a heated nitrogen atmosphere, but also polymerisation in air is possible.

Polymerisation is preferably performed at a temperature from 1 to 70° C., more preferably 5 to 50° C., even more preferably 15 to 30° C.

The polymerised LC film according to the present invention has good adhesion to plastic substrates, in particular to TAC, COP, and colour filters. Accordingly, it can be used as adhesive or base coating for subsequent LC layers which otherwise would not well adhere to the substrates.

The preferred thickness of a polymerised LC film according to the present invention is determined by the optical properties desired from the film or the final product. For example, if the polymerised LC film does not mainly act as an optical layer, but e.g. as adhesive, aligning or protection layer, its thickness is preferably not greater than 1 µm, in particular not greater than 0.5 µm, very preferably not greater than 0.2 µm.

For optical applications of the polymer film, it preferably has a thickness of from 0.5 to 10 µm, very preferably from 0.5 to 5 µm, in particular from 0.5 to 3 µm.

The optical retardation ($R_{th}$) of a polymer film as a function of the wavelength of the incident beam λ is given by the following equation:

$$R_{th} = (\Delta n \cdot d)/\lambda$$

wherein (Δn) is the birefringence of the film, (d) is the thickness of the film and λ is the wavelength of the incident beam.

According to Snellius law, the birefringence as a function of the direction of the incident beam is defined as $$\Delta n = \sin \alpha \sin \beta$$

wherein sin α is the incidence angle or the tilt angle of the optical axis in the film and sin β is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The birefringence (Δn) of the polymer film according to the present invention is preferably in the range from 0.01 to 0.30, more preferable in the range from 0.01 to 0.25 and even more preferable in the range from 0.01 to 0.16.

The optical retardation as a function of the thickness of the polymer film obtained by the method according to the present invention is less than 200 nm, preferable less than 180 nm and even more preferable less than 150 nm.

The uniformly aligned polymer films of the present invention either homeotropically aligned (+C) or planarly aligned (+A), can be used as retardation or compensation film for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

The term "planar orientation/alignment", for example in a layer of an liquid-crystalline material, means that the long molecular axes (in case of calamitic compounds) or the short molecular axes (in case of discotic compounds) of a proportion of the liquid-crystalline molecules are oriented substantially parallel (about 180°) to the plane of the layer.

The term "homeotropic orientation/alignment", for example in a layer of a liquid-crystalline material, means that the long molecular axes (in case of calamitic compounds) or the short molecular axes (in case of discotic compounds) of a proportion of the liquid-crystalline molecules are oriented at an angle θ ("tilt angle") between about 80° to 90° relative to the plane of the layer.

Especially with regard to the incell applications, the polymer films according to the present invention exhibit a high temperature stability. Thus, the polymer films exhibit temperature stability up to 300° C., preferably up to 250° C., more preferably up to 230° C.

The polymer film of the present invention can also be used as alignment film for other liquid-crystalline or RM materials. For example, they can be used in an LCD to induce or improve alignment of the switchable liquid-crystalline medium, or to align a subsequent layer of polymerisable LC material coated thereon. In this way, stacks of polymerised LC films can be prepared.

In particular, optical films obtainable or obtained from a polymerizable LC mixture or formulation comprising the polymer according to the present invention show excellent adhesion without any colouration over time, which is advantageous compared to Tego Addid 900, the most commonly used adhesion promoter. Therefore, the polymer according to the present invention are particularly suitable for the use in polymerizable mixtures or formulations, especially in polymerizable LC formulations.

When used, for example, in a liquid crystal display the polymer according to the present invention can improve the adhesion of the polymerised LC films to the other display components, such as, an alignment layer, electrode layer, color filter, planarization layer, polarizer, compensator, passivation layer, insulting layer, black mask, diffusor, reflector, protective layer, or a PSA (pressure sensitive adhesive) layer e.g. in a stack of films.

When used for security or decorative applications, the polymer according to the present invention can improve the adhesion of the polymerised LC films to the surface of e.g. a document of value or the object to be decorated.

Thus, the invention further relates to a method of increasing the adhesion of a polymer film, obtainable preferably obtained, from a polymerisable LC material or formulation, to a substrate, preferably a plastic substrate, film or surface, by adding at least one polymer according to the present invention to the polymerizable LC mixture or formulation before polymerisation.

The invention further relates to the use of a polymer film or polymerisable LC material or formulation comprising at least one polymer according to the present invention, as described above and below, in optical, electro optical, information storage, decorative and security applications, like liquid crystal displays, projection systems, polarisers, compensators, alignment layers, circular polarisers, colour filters, decorative images, liquid crystal pigments, reflective films with spatially varying reflection colours, multicolour images, non-forgeable documents like identity or credit cards or banknotes.

The invention further relates to an optical component or device, polariser, patterned retarder, compensator, alignment layer, circular polariser, colour filter, decorative image, liquid crystal lens, liquid crystal pigment, reflective film with spatially varying reflection colours, multicolour image for decorative or information storage, comprising at least one a polymer film or polymerisable LC material or formulation, as described above and below The invention further relates to a liquid crystal display comprising at least one polymerisable LC material or formulation, a corresponding polymer film or an optical component, as described above and below.

The invention further relates to authentification, verification or security marking, coloured or multicolour image for security use, non-forgeable object or document of value like an identity or credit card or a banknote, comprising at least one polymer film or polymerisable LC material or an optical component as described above and below.

Another object of the present invention refers to a laminated structure comprising a first substrate and a second substrate, the substrates being optically transparent at selected wavelengths. A surface of the first substrate is in confronting relationship with a surface of the second substrate, and an adhesive layer is disposed between the surfaces. A first UV-cured adhesion promoter layer joins the surface of the first substrate and the adhesive layer, and a second UV-cured adhesion promoter layer joins the surface of the second substrate and the adhesive layer, wherein each of the first and second adhesion promoter layers comprises compounds according to polymer according to the present invention.

In summary, the polymerised LC films and polymerisable LC materials according to the present invention are useful in optical elements like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymerised LC films according to the present invention can be used in displays of the transmissive or reflective type. They can be used in conventional OLED displays or LCDs, in particular LCDs of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell ($\square$-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

The polymerisable material and polymer films according to the present invention are especially useful for a 3D display as described in EP 0 829 744, EP 0 887 666 A2, EP 0 887 692, U.S. Pat. Nos. 6,046,849, 6,437,915 and in "Proceedings o the SID 20th International Display Research Conference, 2000", page 280. A 3D display of this type comprising a polymer film according to the invention is another object of the present invention.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

Unless the context clearly indicates otherwise, as used herein plural forms of the terms herein are to be construed as including the singular form and vice versa.

Throughout this application, unless explicitly stated otherwise, all concentrations are given in weight percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\square$n) is determined at a wavelength of 589.3 nm.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

The examples below serve to illustrate the invention without limiting it. In the foregoing and the following, all temperatures are given in degrees Celsius, and all percentages are by weight, unless stated otherwise.

EXAMPLES

Synthesis Example 1

The compound of interest is prepared according to the following Scheme 1:

Scheme 1
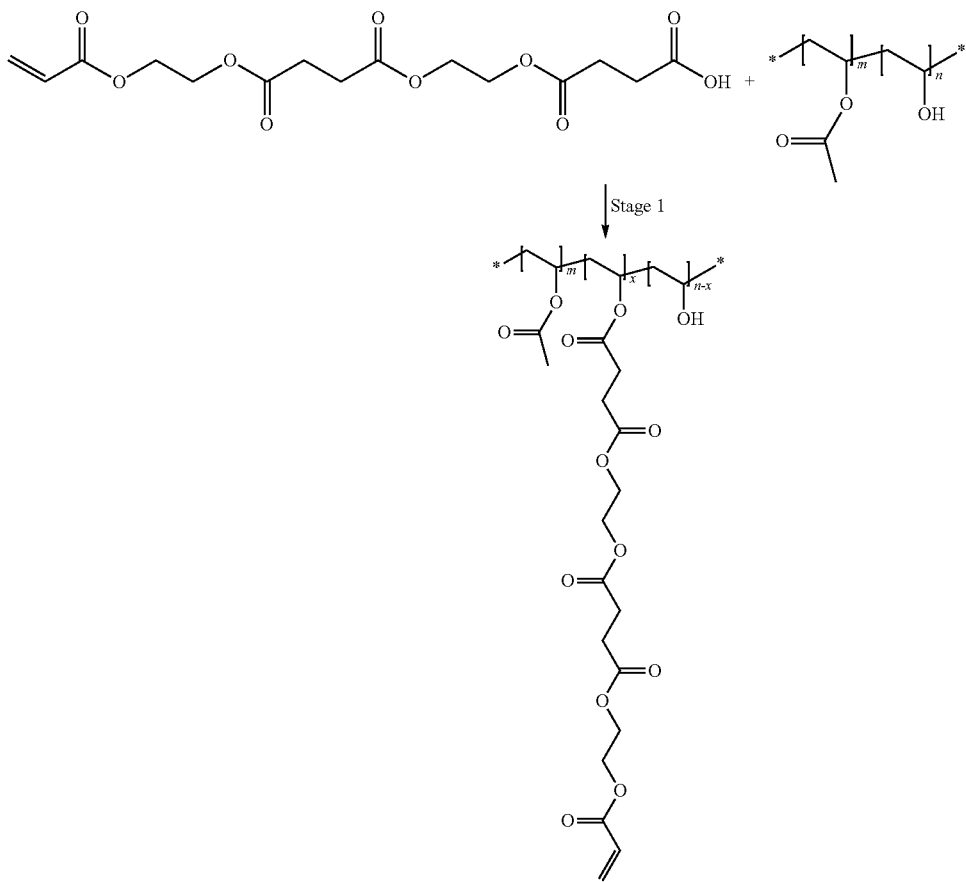
Stage 1.1
Stage 1.1 of the preparation of the compound of interest is depicted in the following Scheme 2:
Scheme 2
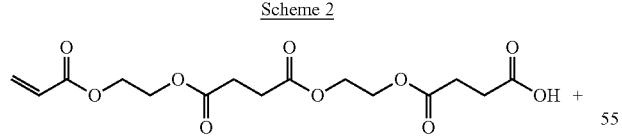
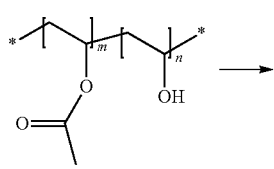
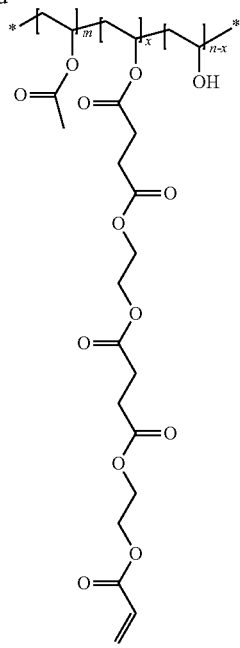
The starting material and product are prepared based on literature method (P. Martens, T. Holland, K. S. Anseth, Polymer 43 (2002) 6093-6100). 4-oxo-4-[2-({4-oxo-4-[2-(prop-2-enoyloxy)ethoxy]butanoyl}oxy)ethoxy]butanoic acid (6 g, 16.65 mmol) in anhydrous dichloromethane (10 mL). N,N'-dicyclohexylcarbodiimide (8.33 ml; 8.33 mmol) (1 M in dichloromethane; 8.33 mL) is now added dropwise over ice/water bath. The mixture is stirred at 20° C. for 75 min, then filtrated, washed through with 10 mL dichloromethane petroleum ether (3:1 ratio). The filtrate is evaporated, and then a solution of poly(vinyl alcohol) (Mw 9,000-10,000, 80 mol.-% hydrolyzed) (1.47 g) in anhydrous dimethylsulfoxide (8 mL) is added to the evaporated filtrate in dimethylsulfoxide (5 mL). Triethylamine (1.16 ml; 8.33 mmol) and 4-(dimethylamino)pyridine (50.83 mg; 0.42 mmol) are added and the resulting solution is stored for 2 days at 20° C. The mixture is poured onto vigorously stirred water (250 mL). The residue is dissolved in acetone (50 mL) and precipitated into diethyl ether (150 mL). The solid is collected and dried under reduced pressure overnight (1 g).

Raman Spectroscopy: methacrylate group; u(C=O) 1722 cm$^{-1}$, u(C=C) 1635 cm$^{-1}$, u(C—O—C) asym 1124 cm$^{-1}$.

Synthesis Example 2

The compound of interest is prepared according to the following Scheme 3:

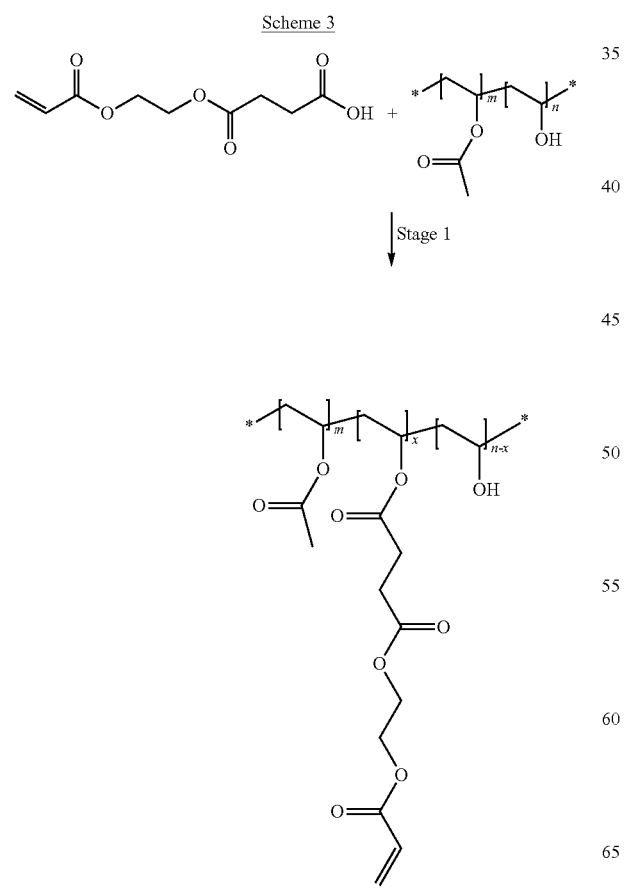

Stage 2.1:

Stage 2.1 of the preparation of the compound of interest is depicted in the following Scheme 4:

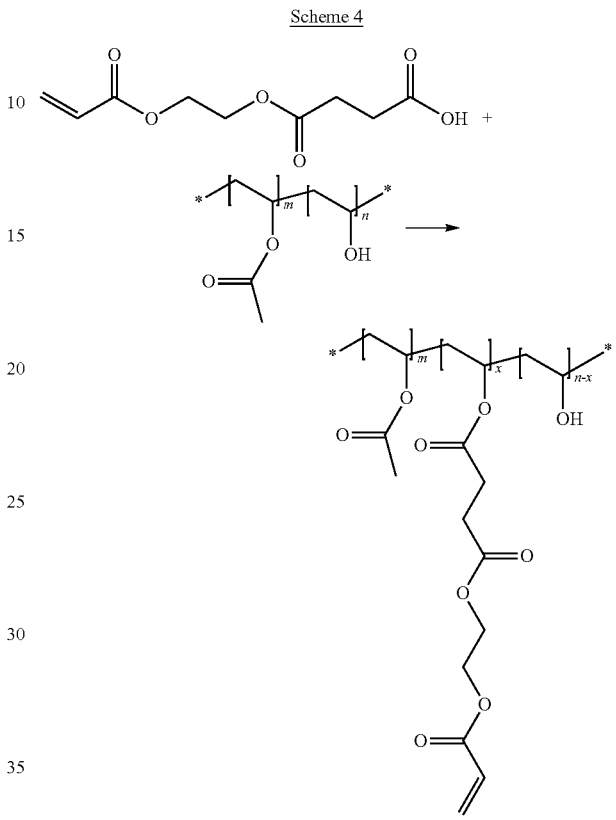

This compound is prepared based on literature method (P. Martens, T. Holland, K. S. Anseth, Polymer 43 (2002) 6093-6100). To a 60 mL anhydrous dichloromethane solution of the succinic acid mono-(2-acryloyloxy-ethyl) ester (17.95 ml; 102.15 mmol.) N,N'-dicyclohexylcarbodiimide (10.54 g; 51.07 mmol) is slowly added (while cooling at ice bath). After stirring at room temperature for 1 h under nitrogen, the precipitate is filtered off. The filtrate is evaporated, and the residue is dissolved in anhydrous DMSO (5 mL), and a solution of poly(vinyl alcohol) (Mw 9,000-10,000, 80 mol.-% hydrolyzed) (9.00 g) in 50 mL dimethyl sulfoxide (which is prepared by heating at 60° C. for 1 h) is added at room temperature. Triethylamine (2.85 ml; 20.43 mmol) is added and the solution is stirred overnight at room temperature. The mixture is precipitated in 600 mL water. The precipitate is collected and dried under reduced pressure overnight (8 g).

Raman Spectroscopy: methacrylate group; u(C=O) 1742 cm$^{-1}$, u(C=C) 1635 cm$^{-1}$, u(C—O—C) asym 1120 cm$^{-1}$ Synthesis Example 3

The compound of interest is prepared according to the following Scheme 5:

Scheme 5
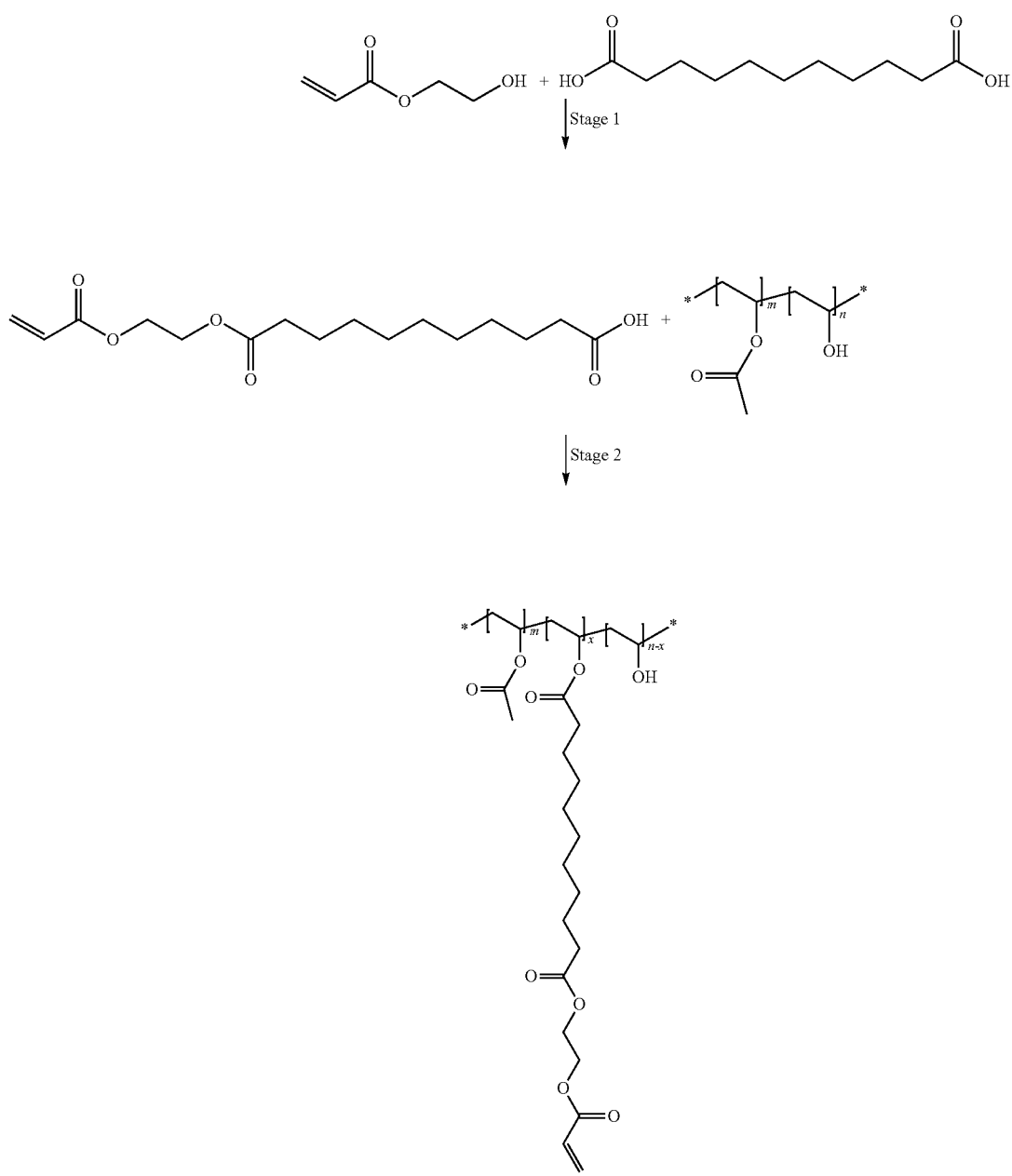
Stage 3.1
Stage 3.1 of the preparation of the compound of interest is depicted in the following Scheme 6:
Scheme 6
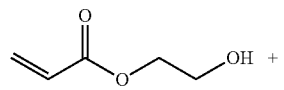
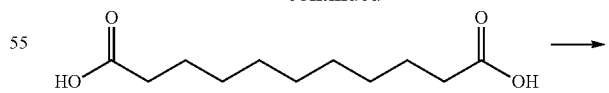
To a solution of undecanedioic acid (21.30 g; 98.49 mmol) in 100 mL anhydrous dichloromethane, trifluoroacetic anhydride (27.38 mL; 196.97 mmol) is added at room temperature. The solution is stirred at 40° C. for 30 min then 2-hydroxyethyl acrylate (5.72 g; 49.24 mmol) is added. The reaction mixture is stirred at room temperature overnight. Water (100 mL) is added and organic phase is separated, washed with brine, dried over sodium sulphate and evaporated in vacuum. The residue is purified by flash chromatography on Silica gel eluting with 5% ethyl acetate in dichloromethane which gave 14.4 g of product.

Stage 3.2

Stage 3.2 of the preparation of the compound of interest is depicted in the following Scheme 7:

Scheme 7

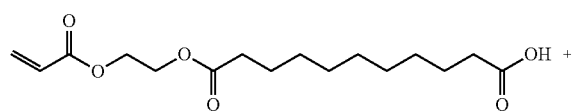

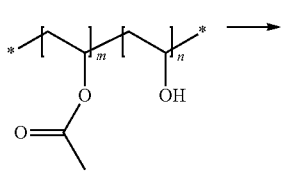

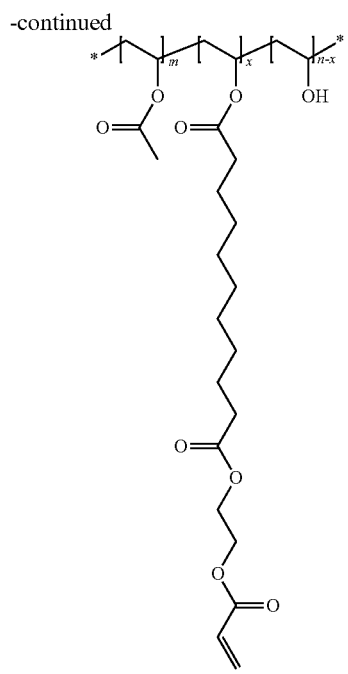

To a solution of the product of stage 3.1 (10.75 g; 34 mmol) in anhydrous dichloromethane (14 mL), over ice/water is added N,N'-dicyclohexylcarbodiimide (3.52 g; 17 mmol). After stirring for 90 min at about 20° C., the solid is filtered and the filtrate is evaporated and dissolved in anhydrous DMSO (5 mL). A solution of poly(vinyl alcohol) (Mw 9,000-10,000, 80 mol.-% hydrolyzed) (3.01 g) in anhydrous DMSO (17 mL) is now added, followed by triethylamine (0.9 mL). The mixture is stirred in the dark at about 20° C. for 18 hours, then added to vigorously stirred water (100 mL). The solid is solubilised in acetone (50 mL) then is precipitated in water (300 mL). The precipitate is collected and dried under reduced pressure overnight (4.0 g). Raman Spectroscopy: methacrylate group; u(C=O) 1725 cm$^{-1}$, u(C=C) 1638 cm$^{-1}$, u(C—O—C) asym 1098 cm$^{-1}$.

Synthesis Example 4

The compound of interest is prepared according to the following Scheme 8:

Scheme 8

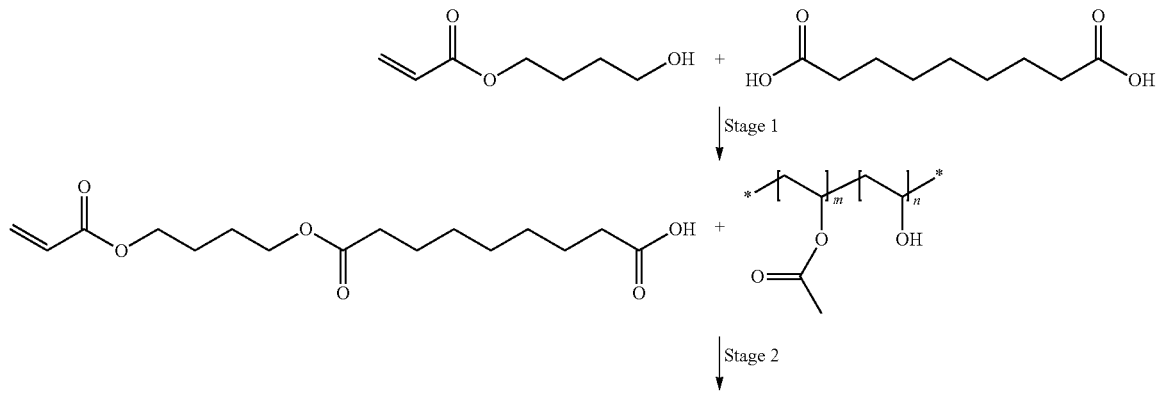

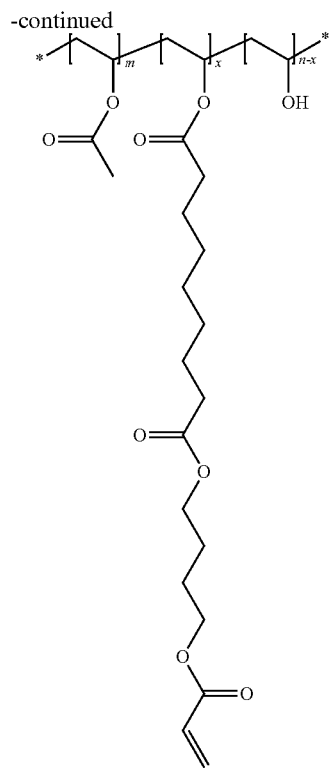

Stage 4.1

Stage 4.1 of the preparation of the compound of interest is depicted in the following Scheme 9:

Scheme 9

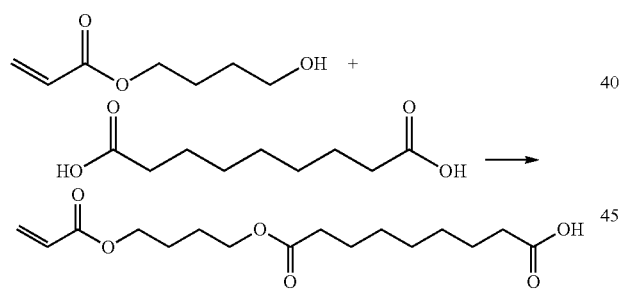

The nonanedioic acid (37.60 g; 199.77 mmol) is added to a flask containing 100 mL dichloromethane. Trifluoroacetic anhydride (55.53 ml; 399.53 mmol) is added at room temperature. The solution is stirred at 35° C. for 90 min then 4-hydroxy-butyl acrylate (14.40 g; 99.88 mmol) is added. The reaction mixture is stirred at room temperature overnight. Water (100 mL) is added and organic phase is separated, washed with brine, dried over sodium sulphate and evaporated under reduced pressure. The residue is purified by flash chromatography on Silica gel eluting with 0-5% ethyl acetate in dichloromethane which gave 13.5 g of product.

Stage 4.2

Stage 4.2 of the preparation of the compound of interest is depicted in the following Scheme 10:

Scheme 10

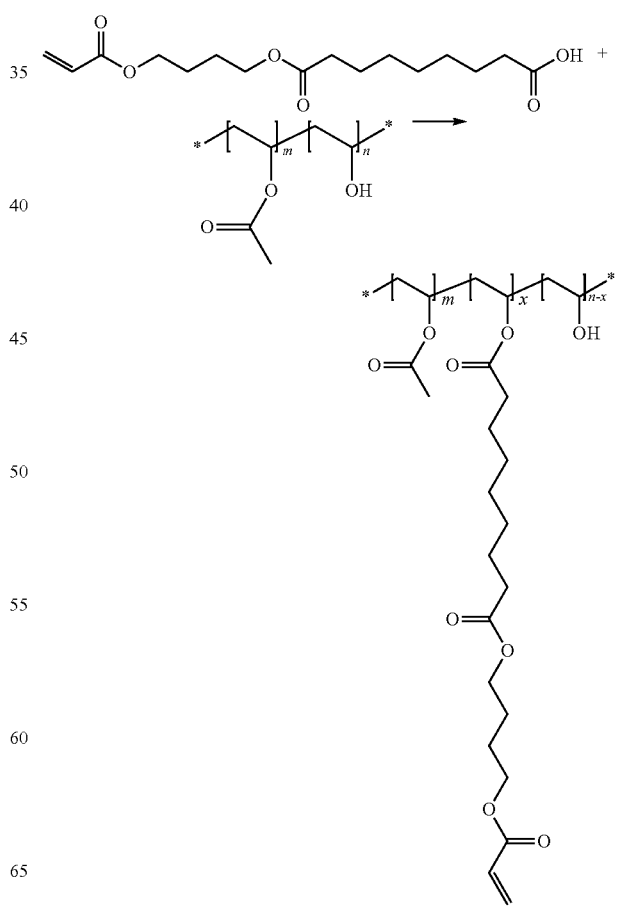

To a solution of the product of stage 4.1 (7 g; 22 mmol) in anhydrous dichloromethane (10 mL), over ice/water is added N,N'-dicyclohexylcarbodiimide (2.3 g; 11 mmol). After stirring for 90 min at about 20° C., the precipitate is filtered off. The filtrate is evaporated; the residue is dissolved in anhydrous DMSO (4 mL). A solution of poly(vinyl alcohol) (Mw 9,000-10,000, 80 mol.-% hydrolyzed) (1.96 g) in anhydrous DMSO (11 mL; pre-dissolved at 60° C. before cooling) is now added, followed by triethylamine (0.6 mL). The mixture is stirred at rt for 18 hours. The mixture is precipitated in water (150 mL). The solid is collected and solubilised in acetone (70 mL) and is added to vigorously stirred water (300 mL). The solid is collected and dried under reduced pressure overnight (2 g).

Raman Spectroscopy: methacrylate group; u(C=O) 1723 cm$^{-1}$, u(C=C) 1639 cm$^{-1}$, u(C—O—C) asym 1118 cm$^{-1}$.

Synthesis Example 5

The compound of interest is prepared according to the following Scheme 11:

Stage 5.1

Stage 5.1 of the preparation of the compound of interest is depicted in the following Scheme 12:

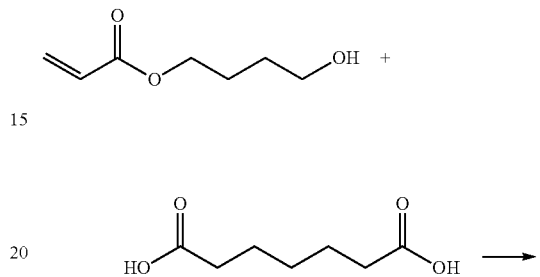

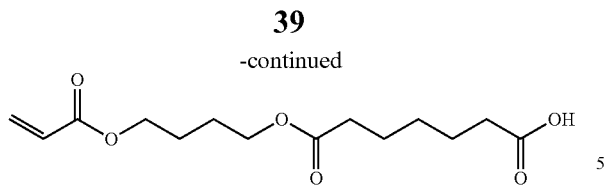

To a solution of heptanedioic acid (16.00 g; 99.90 mmol) in 100 mL anhydrous dichloromethane, trifluoroacetic anhydride (27.77 mL; 199.79 mmol) is added at room temperature. The solution is stirred at 35° C. for 30 min then 4-hydroxybutyl acrylate (7.20 g; 49.95 mmol) is added. The reaction mixture is stirred at room temperature overnight. Water (100 mL) is added and organic phase is separated, washed with brine, dried over sodium sulphate and evaporated in vacuum. The residue is purified by flash chromatography on Silica gel eluting with 0-20% ethyl acetate in dichloromethane which gave 7.9 g of product.

Stage 5.2

Stage 5.2 of the preparation of the compound of interest is depicted in the following Scheme 13:

Scheme 13

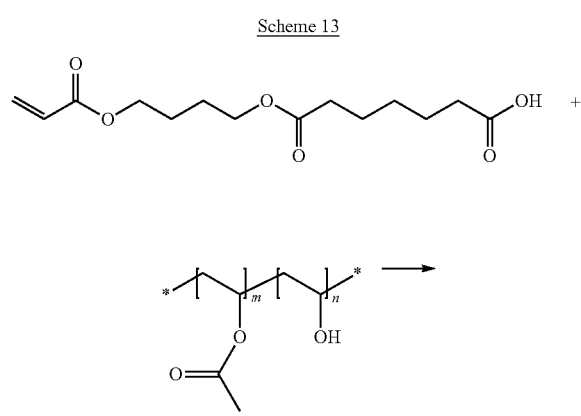

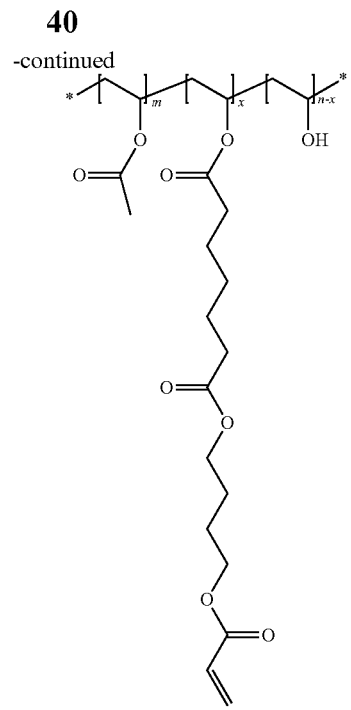

To a solution of the product of stage 5.1 (7.8 g; 28 mmol) in anhydrous dichloromethane (12 mL), over ice/water is added N,N'-dicyclohexylcarbodiimide (2.85 g; 14 mmol). After stirring for 90 min at about 20° C., the precipitate is filtered off. The filtrate is evaporated, and the residue is dissolved in anhydrous DMSO (5 mL). A solution of poly(vinyl alcohol) (Mw 9,000-10,000, 80 mol.-% hydrolyzed) (2.43 g) in anhydrous DMSO (15 mL; pre-dissolved at 60° C. before cooling) is now added, followed by triethylamine (0.75 mL). The mixture is stirred at about 20° C. for 18 hours, and then added to vigorously stirred water (250 mL). The solid is dissolved in acetone (80 mL) and is added to vigorously stirred water (300 mL). The precipitate is collected and dried under reduced pressure overnight (2 g).

Raman Spectroscopy: methacrylate group; u(C=O) 1733 cm$^{-1}$, u(C=C) 1640 cm$^{-1}$, u(C—O—C) asym 1132 cm$^{-1}$.

Synthetic Example 6

The compound of interest is prepared according to the following Scheme 14:

Scheme 14

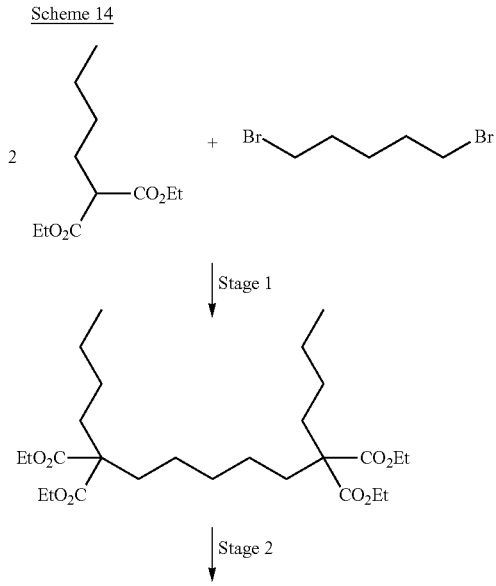

-continued
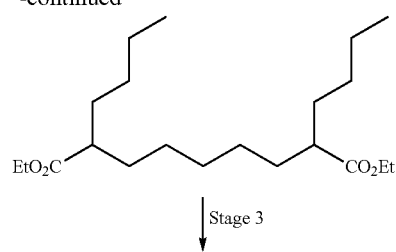
↓ Stage 3
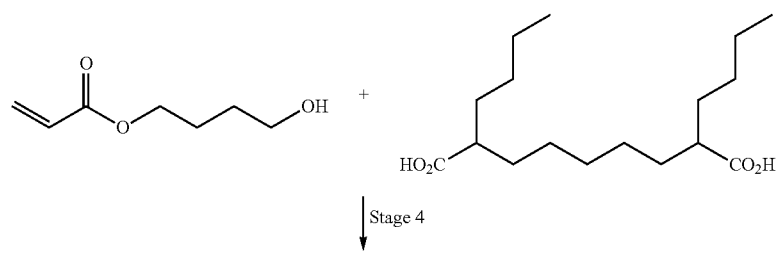
↓ Stage 4
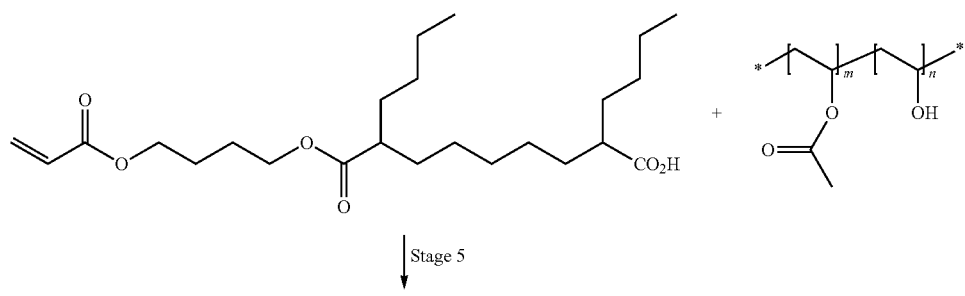
↓ Stage 5
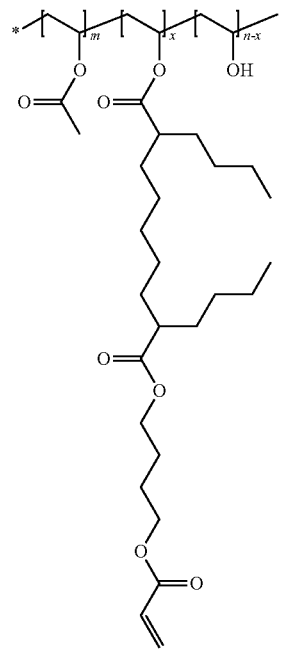

Stage 6.1

Stage 6.1 of the preparation of the compound of interest is depicted in the following Scheme 15:

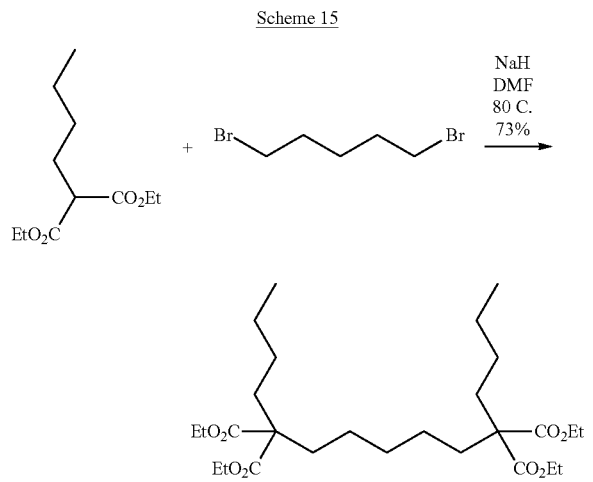

To a solution of n-butylmalonate diethyl ester (20 g; 93 mmol) in anhydrous DMF (200 mL) is added sodium hydride (60% by weight in oil; 4.08 g) in one portion. After 40 minutes, 1,5-dibromopentane (6.3 mL; 46 mmol) is added and the mixture heated to 80° C. for 3 hours, cooled and then partitioned between water and petroleum ether 40-60. The organic layer is evaporated, washed with 10% sodium hydroxide solution, water, brine, dried over sodium sulphate and evaporated. The residue is recrystallised from petroleum ether, filtered and washed with cold petrol (2×20 mL) to give product as a white solid (17 g).

Stage 6.2

Stage 6.2 of the preparation of the compound of interest is depicted in the following Scheme 16:

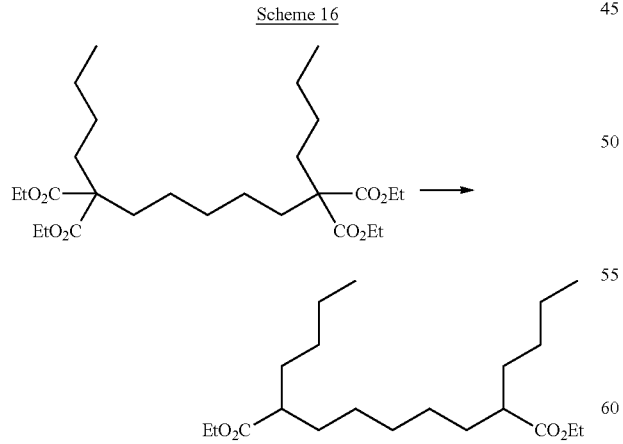

Product of stage 6.1 (30 g; 60 mmol), anhydrous lithium chloride (10.2 g; 24 mmol) and water (2.3 mL; 13 mmol) in anhydrous DMSO (216 mL) are heated to 185° C. for 17 hours, cooled, then partitioned between petroleum ether (1.2 L) and water (1 L). The organic layer is separated, washed with water, brine, dried over sodium sulphate and evaporated in vacuum. The residual orange oil is chromatographed on silica eluting with 10% ethyl acetate in petroleum ether, to afford product as yellow oil (18.3 g).

Stage 6.3

Stage 6.3 of the preparation of the compound of interest is depicted in the following Scheme 17:

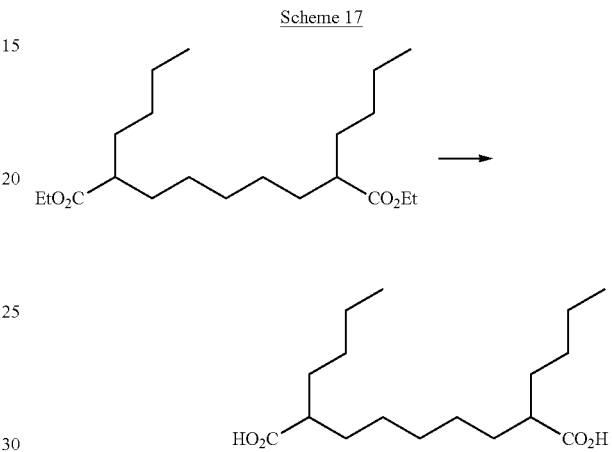

A mixture of product of stage 6.2 (18 g; 51 mmol), sodium hydroxide (10 g; 25 mmol), water (60 mL) and IMS (120 mL) are heated at reflux for 45 minutes. After cooling, most of the IMS is removed in vacuum; further water added (120 mL) and the resulting solution heated to 55° C. for 18 hours. After cooling, concentrated hydrochloric acid (40 mL) is added slowly while cooling the stirring mixture with a cold water bath. The acidified mixture is extracted with DCM (2×100 mL), and the combined organic extracts are dried over sodium sulphate and evaporated to give product as yellow partially crystallising oil (15.5 g).

Stage 6.4

Stage 6.4 of the preparation of the compound of interest is depicted in the following Scheme 18:

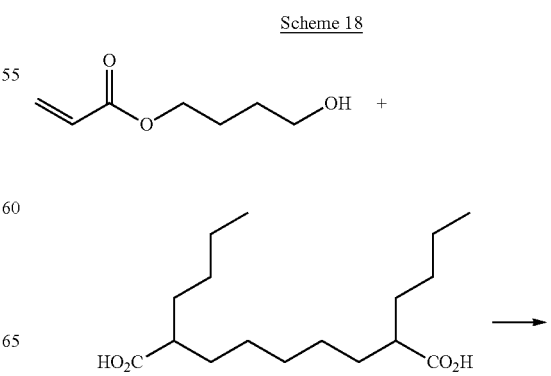

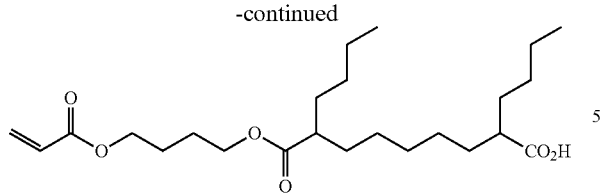

To a solution of product stage 6.3 (15.5 g; 52 mmol), 4-hydroxybutylacrylate (7.15 g) and 4-(dimethylamino)pyridine (2.35 g; 19 mmol) in anhydrous dichloromethane (140 mL) is added N,N'-dicyclohexylcarbodiimide (1M in dichloromethane; 51.7 mL). After 2 hours, the mixture is concentrated in vacuum, then ethyl acetate (200 mL) is added, filtered and washed through with ethyl acetate. The filtrate is washed with 2M hydrochloric acid, brine, dried over sodium sulphate and evaporated under reduced pressure. The residue is chromatographed on silica eluting with 3.5% ethyl acetate in dichloromethane to remove the top spot (bis-acylated product) then with 8% ethyl acetate in dichloromethane to elute the desired product as pale yellow oil (7.6 g).

Stage 6.5

Stage 6.5 of the preparation of the compound of interest is depicted in the following Scheme 19:

Scheme 19

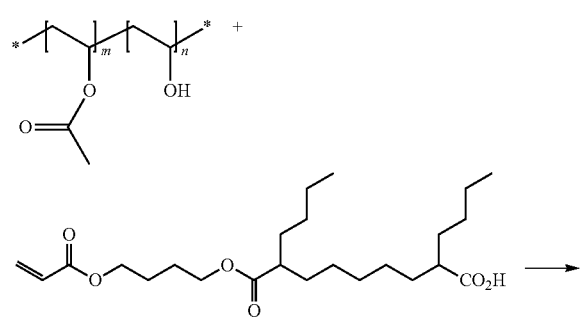

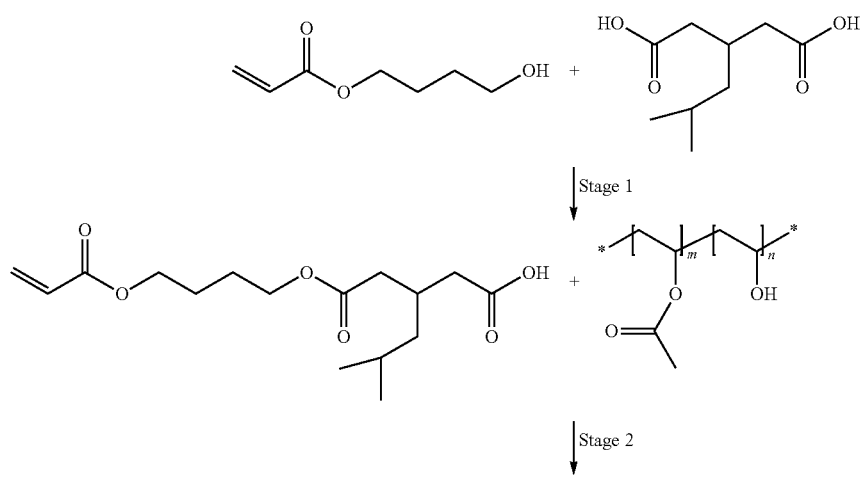

To a solution of the product of stage 6.4 (7.5 g; 176 mmol) in anhydrous dichloromethane (10 mL), is added N,N'-dicyclohexylcarbodiimide (1M in dichloromethane; 8.8 mL). After stirring for 90 min at about 20° C., the precipitate is filtered off. The filtrate is evaporated; the residue is dissolved in anhydrous DMSO (5 mL). A solution of poly(vinyl alcohol) (Mw 9,000-10,000, 80 mol.-% hydrolyzed) (1.55 g) in anhydrous DMSO (12 mL, preheated at 60° C. before cooling to r.t.) is now added to the, followed by triethylamine (0.8 mL) and 4-(dimethylamino)pyridine (75 mg). The resulting solution is stirred at 18° C. for 64 hours. The reaction mixture is poured to water (300 mL). The solid is dissolved in 50 mL acetone, and then is added to petroleum ether (150 mL). The solid is collected and dried under reduced pressure overnight (2 g). Raman Spectroscopy: methacrylate group; $u(C=O)$ 1726 $cm^{-1}$, $u(C=C)$ 1635 $cm^{-1}$, $u(C-O-C)$ asym 1138 $cm^{-1}$.

Synthetic Example 7

The compound of interest is prepared according to the following Scheme 20:

Scheme 20

-continued

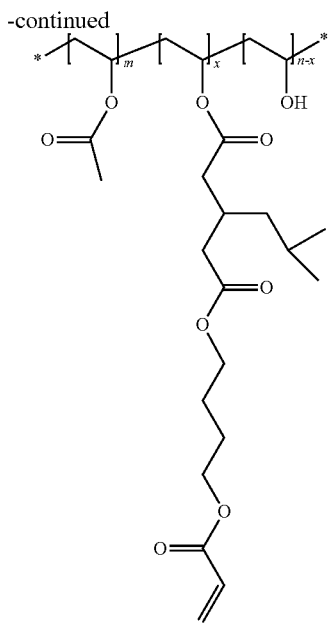

Stage 7.1

Stage 7.1 of the preparation of the compound of interest is depicted in the following Scheme 21:

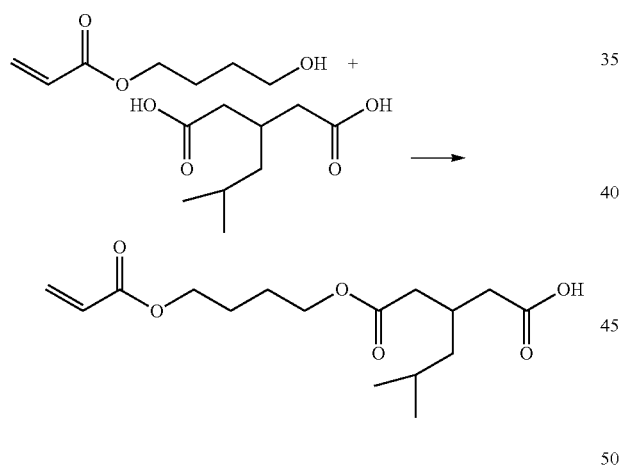

Scheme 21

Trifluoroacetic acid anhydride (21.6 mL; 154 mmol) is added dropwise to a solution of 3-isobutylglutaric acid (29 g; 154 mmol) in anhydrous dichloromethane (120 mL). The resulting solution is heated to 35° C. for 90 mins. 4-Hydroxybutyl acrylate (22.2 g; 154 mmol) is added dropwise and the solution stirred at 35° C. for a further 6 hours. The solution is cooled water (100 mL) added dropwise over a cold water bath. The organic phase is separated. The aqueous layer is further extracted with dichloromethane (50 mL). The combined organic layers are dried over sodium sulphate and evaporated under reduced pressure. The crude product is purified by column chromatography on Silica gel eluting with 0-10% ethyl acetate in dichloromethane (36 g).

Stage 7.2

Stage 7.2 of the preparation of the compound of interest is depicted in the following Scheme 22:

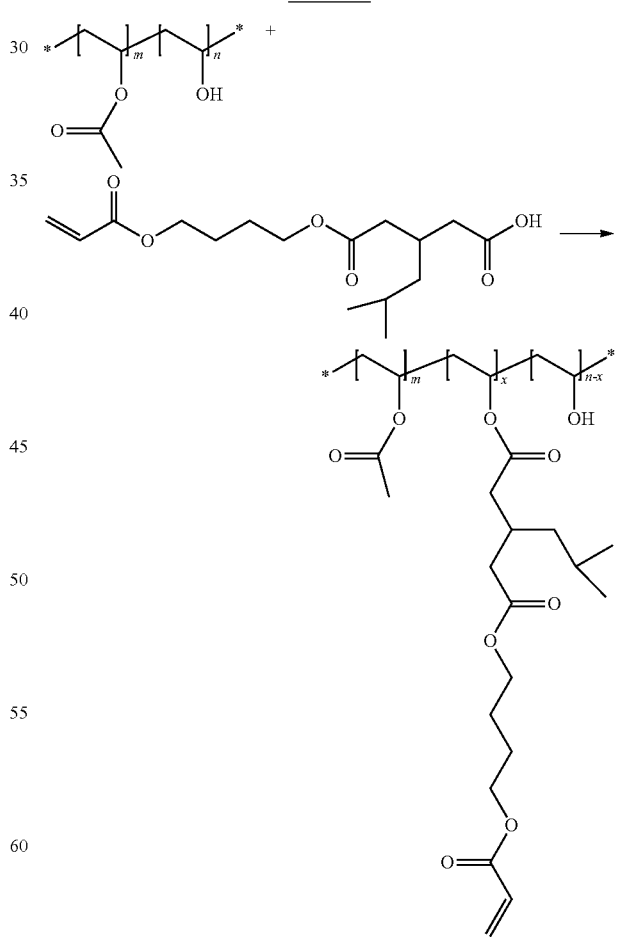

Scheme 22

N,N'-Dicyclohexylcarbodiimide (14.45 g; 0.07 moles) is added portionwise to a solution of product of stage 7.1 (44 g; 14 mmol) in anhydrous dichloromethane (100 mL). The mixture is stirred at room temperature for 90 min, petroleum ether (50 mL) added and the resulting slurry filtered and washed through with 2:1 dichloromethane:petroleum ether (3×15 mL). The filtrate is evaporated under reduced pressure, the residue is dissolved in anhydrous DMSO (4 mL). A solution of poly(vinyl alcohol) (Mw 9,000-10,000, 80 mol.-% hydrolyzed) (12.33 g) in anhydrous DMSO (95 mL, predissolved at 60° C. before cooling) is now followed by triethylamine (7.5 mL; 0.054 moles) and 4-(dimethylamino) pyridine (0.5 g; 0.0041 moles). The resulting solution is stirred at 20° C. in for 42 hours. The mixture is added to water (1200 mL). The solid is collected and dissolve in acetone (50 mL) and precipitate in methanol:water (1:10 ratio, 500 mL). The solid is collected and dried under reduced pressure overnight (15 g). Raman Spectroscopy: methacrylate group; u(C=O) 1723 cm$^{-1}$, u(C=C) 1637 cm$^{-1}$, u(C—O—C) asym 1142 cm$^{-1}$.

Mixtures

The following Tables 1 to 3 provides mixtures according to the present invention.

TABLE 1

| Mixture +C-1 (all amounts as % b.w.) | |
| --- | --- |
| Compounds | Amount |
| Irganox 1076 | 0.08 |
| Irgacure 651 | 1.00 |
| [acrylate-O-(CH$_2$)$_6$-O-phenyl-COO-phenyl-CN] | 19.78 |
| [acrylate-O(CH$_2$)$_6$O-phenyl-COO-phenyl(CH$_3$)-OCO-phenyl-O(CH$_2$)$_6$-O-acrylate] | 22.25 |
| [acrylate-O(CH$_2$)$_3$O-phenyl-COO-phenyl(CH$_3$)-OCO-phenyl-O(CH$_2$)$_3$-O-acrylate] | 22.25 |
| [acrylate-O-(CH$_2$)$_6$-O-phenyl-COO-phenyl-cyclohexyl(H)-C$_3$H$_7$] | 34.64 |

TABLE 2

| Mixtures +C-2 (all amounts as % b.w.) | |
| --- | --- |
| Compounds | Amount |
| Irganox 1076 | 0.08 |
| Irgacure 651 | 5.53 |
| [acrylate-O-(CH$_2$)$_6$-O-phenyl-COO-phenyl-CN] | 37.64 |
| [acrylate-O(CH$_2$)$_3$O-phenyl-COO-phenyl(CH$_3$)-OCO-phenyl-O(CH$_2$)$_3$-O-acrylate] | 21.11 |
| [acrylate-O-(CH$_2$)$_6$-O-phenyl-COO-phenyl-cyclohexyl(H)-C$_3$H$_7$] | 35.64 |

TABLE 3

Mixture +A-1 (all amounts as % b.w.)

| Compounds | Amount |
|---|---|
| Irganox 1076 | 0.08 |
| FluorN 562 | 5.6 |
| ![structure with O(CH2)6 linkers and CH3 substituted central ring] | 20.5 |
| ![structure with O(CH2)3 linkers and CH3 substituted central ring] | 73.32 |

EXPERIMENTAL

±C

Comparative Experiment 1

Five mixtures are prepared using a base mixture of +C-1. It had been previously seen that 1% additive—which is standard in these tests—did not provide good adhesion so the concentration of 3-(Trimethoxysilyl)propyl methacrylate is vastly increased.

50% 3-(Trimethoxysilyl)propyl methacrylate
60% 3-(Trimethoxysilyl)propyl methacrylate
70% 3-(Trimethoxysilyl)propyl methacrylate
80% 3-(Trimethoxysilyl)propyl methacrylate
40% 3-(Trimethoxysilyl)propyl methacrylate Subsequently, the mixtures are coated on ZEON COP using Mayer Bar 6, annealed for 5 mins at 90° C. temperature and then cured in a 250-450 nm mercury vapour lamp at 50 mWcm$^{-2}$ for 1 minute. The results of these experiments are summarized in Tables C1 and C2. X denotes full delamination from substrate, Δ denotes some degree of adhesion, and ○ denotes full adhesion to the substrate.

TABLE C1

Results for high % 3-(Trimethoxysilyl)propyl methacrylate mixtures cured at 25° C.

| % 3-(Trimethoxysilyl)propyl methacrylate | Film clarity | Homeotropic Alignment checked by eye between crossed polarisers | Adhesion |
|---|---|---|---|
| 40 | ○ | ○ | X |
| 50 | ○ | ○ | X |
| 60 | ○ | ○ | X |
| 70 | X | X | ○ |
| 80 | X | X | ○ |

TABLE C2

Results for high % 3-(Trimethoxysilyl)propyl methacrylate mixtures cured at 25° C.

| % 3-(Trimethoxysilyl)propyl methacrylate | Film clarity | Homeotropic Alignment checked by eye between crossed polarisers | Adhesion |
|---|---|---|---|
| 40 | ○ | X | X |
| 50 | ○ | X | X |
| 60 | ○ | X | X |
| 70 | ○ | X | X |
| 80 | ○ | X | X |

Good adhesion can be attained when annealing 70% and 80% methacrylate silane at room temperature instead of 90° C., however these films cannot be used due to the fact they are completely opaque once cured. Annealing the film at 90° C. produced transparent films however the alignment suffers and bad adhesion is seen using the standard cross-hatched scoring and tape test outlined below.

The adhesion of the film to the substrate is tested using the Nichiban 305 tape test. The film is scored in a cross-hatched pattern of 100 squares. The 305 tape is thereby applied over the polymer film in the cross-hatched region and removed sharply. The adhesion is deemed to pass if the film is not removed

Experiment 1

The adhesion promoters of example 1 to 7 are mixed in the given amount with base mixture +C-1. However, some of them suffered from very bad solubility in the standard solvents used for preparing reactive mesogen solutions. In these cases the additive is not dissolved in the mixture +C-1 and as such bad adhesion is found in the coated film. In the case of Example 1 good solubility is found, however this additive did not promote adhesion in this test. The results are shown in Table 4. The signs have the following meanings: X denotes full delamination from substrate, Δ denotes some degree of adhesion, and ○ denotes full adhesion to the substrate.

TABLE 4

Solubility and adhesion quality of various PVA additives in +C-1

| Additive | Solubility | Adhesion with 1% Additive |
|---|---|---|
| Example 1 | ○ | X |
| Example 2 | Δ | ○ |

TABLE 4-continued

Solubility and adhesion quality of various PVA additives in +C-1

| Additive | Solubility | Adhesion with 1% Additive |
|---|---|---|
| Example 3 | X | X |
| Example 4 | X | X |
| Example 5 | X | X |
| Example 6 | X | X |
| Example 7 | ○ | ○ |

Experiment 2

Additionally a second additive (Example 2) is added to a +C-1 mixture and dissolved in solvent (2:1 MEK/Cyclopentanone) to 15% solids. In this case the adhesion is tested on glass by removal of tape as previously mentioned. The results of this experiment are shown in Table 5 below. The signs have the following meanings: X denotes full delamination from substrate, Δ denotes some degree of adhesion, and ○ denotes full adhesion to the substrate.

TABLE 5

Adhesion

| | % Example 2 in mixture +C-1 | | |
|---|---|---|---|
| | 0 | 1 | 5 |
| Adhesion | XX | ○ | ○ |

The results are also depicted in FIG. 1. Left column: 0% of Example 2, tape removed on right side and delamination can be seen Middle column=1% of Example 2, tape removed on right side and no delamination can be seen. Right column=5% of Example 2, tape removed on right side and no delamination can be seen.

Experiment 3

Figure 2:
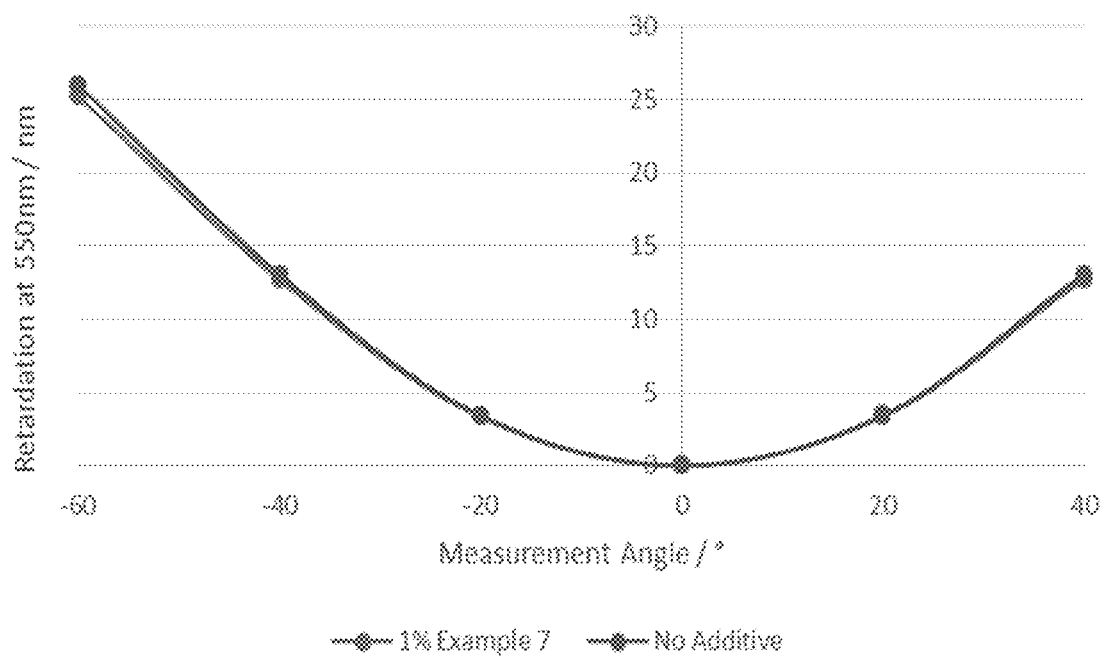
FIG. 2 depicts results from experiment 3.

The adhesion promoter example 7 is added in between 1-5% by weight to mixture +C-1 and dissolved to 20% solids in 2:1 MEK/Cyclopentanone. The resulting solution is bar coated (Mayer Bar 5) onto the corresponding corona treated COP substrate, annealed at room temperature or 60° C. and photopolymerised (20 mWcm$^{-2}$, 60 s, N$_2$). The qualities of the alignment is checked by eye through crossed polarizers as well as via ellipsometry and all have good alignment as shown in Table 6 and FIG. 2.

TABLE 6

Rotation angle and retardation

| Rotation Angle/° | −60 | −40 | −20 | 0 | 20 | 40 |
|---|---|---|---|---|---|---|
| No Additive Retardation/nm | 25.9 | 13.1 | 3.4 | 0.0 | 3.5 | 13.1 |
| 1% Example 7 Retardation/nm | 25.2 | 12.7 | 3.4 | 0.0 | 3.4 | 12.8 |

The adhesion of the film to the substrate is tested using the Nichiban 305 tape test. The film is scored in a cross-hatched pattern of 100 squares. The 305 tape is thereby applied over the polymer film in the cross-hatched region and removed sharply. The adhesion is deemed to pass if the film is not removed (Table 7). The signs have the following meanings: X denotes full delamination from substrate, Δ denotes some degree of adhesion, and ○ denotes full adhesion to the substrate.

TABLE 7

Annealing temperature

| Annealing | % Example 7 in mixture +C-1 | | | |
|---|---|---|---|---|
| Temperature | 0 | 1 | 3 | 5 |
| 25° C. | X | ○ | ○ | Δ |
| 60° C. | X | ○ | ○ | ○ |

Experiment 4

The adhesion promoter example 7 is added in between 1-2% by weight to mixture +C-2 and dissolved to 25% solids in 2:1 MEK/Cyclopentanone. The resulting solution is spin-coated (1500 rpm) onto the corresponding raw glass substrate, annealed 50° C. and photopolymerised (150 mWcm$^{-2}$, 1.8 s, N$_2$). The quality of the alignment is checked by eye through crossed polarizers as well as via polarized optical microscopy.

The adhesion of the film to the substrate is tested using the Nichiban 305 tape test. The 305 tape is thereby applied over the polymer film and removed sharply. The adhesion is deemed to pass if the film is not removed. The results are shown in Table 8. The signs have the following meanings: X denotes full delamination from substrate, Δ denotes some degree of adhesion, and O denotes full adhesion to the substrate.

TABLE 8

Adhesion

| | % Example 7 in mixture +C-2 | | | | |
|---|---|---|---|---|---|
| | 0 | 1 | 2 | 3 | 4 |
| Adhesion | X | ○ | ○ | ○ | ○ |

Experiment 5

Figure 3:
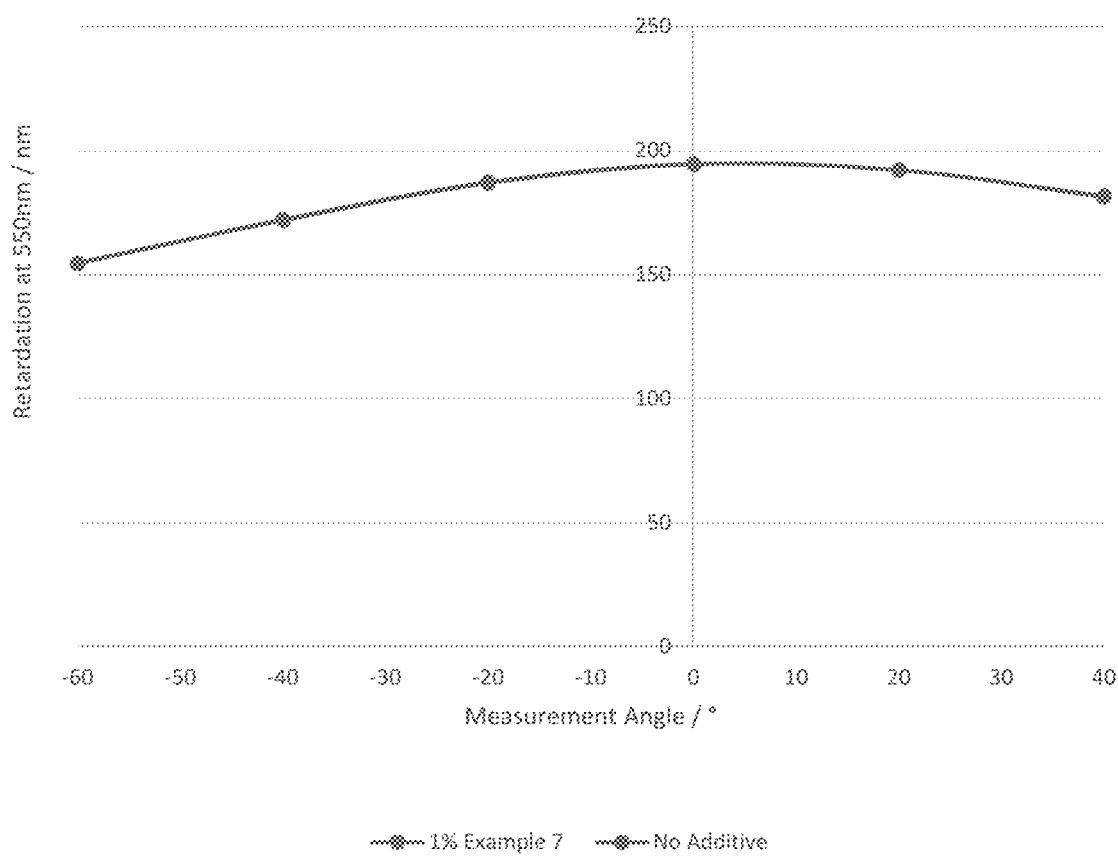
FIG. 3 depicts results from experiment 5.

The adhesion promoter example 7 is added in 1-2% by weight to the +A-1 mixture and dissolved to 25% solids in 7:3 Toluene/Cyclohexanone. The resulting solution is bar coated (Mayer Bar 5) onto the corresponding rubbed TAC substrate, annealed 60° C. and photopolymerised (120 mWcm$^{-2}$, 3 s, Air). The alignment of the films is measured using an ellipsometer and good alignment is seen for all films. Retardation profiles of these films can be seen in Table 9 and FIG. 3.

TABLE 9

Rotation angle and retardation

| Rotation Angle | −60 | −40 | −20 | 0 | 20 | 40 |
|---|---|---|---|---|---|---|
| No Additive Retardation | 154.54 | 171.84 | 186.90 | 194.43 | 192.19 | 181.69 |
| 1% example 7 Retardation | 154.82 | 172.24 | 187.32 | 194.66 | 192.18 | 181.28 |

The adhesion of the film to the substrate is tested using the Nichiban 305 tape test. The film is scored in a cross-hatched pattern of 100 squares. The 305 tape is thereby applied over the polymer film in the cross-hatched region and removed sharply. The adhesion is deemed to pass if the film is not removed (Table 10). The signs have the following meanings:

X denotes full delamination from substrate, Δ denotes some degree of adhesion, and ○ denotes full adhesion to the substrate.

TABLE 10

| Annealing | Annealing temperature | | |
|---|---|---|---|
| Temperature | % example 7 in +A-1 | | |
|  | 0 | 1 | 2 |
| 60° C. | X | ○ | ○ |

Experiment 6

The adhesion promoter example 7 is added in 2% by weight to the +A-1 mixture and dissolved to 25% solids in 7:3 Toluene/Cyclohexanone. The resulting solution is spin-coated (1500 rpm) onto the corresponding rubbed PI coated glass substrate, annealed at 68° C. and photopolymerised (150 mWcm$^{-2}$, 1.8 s, N$_2$).

The adhesion of the film to the substrate is tested using the Nichiban 305 tape test. The 305 tape is thereby applied over the polymer film and removed sharply. The adhesion is deemed to pass if the film is not removed. Without an additive the bulk mixture had good adhesion to the PI in this case, so subsequent tape tests are performed until each mixture failed the adhesion test (Table 11). The signs have the following meanings: X denotes full delamination from substrate, Δ denotes some degree of adhesion, and O denotes full adhesion to the substrate.

TABLE 11

| | Tape removals | | | | |
|---|---|---|---|---|---|
| | 0 | 1 | 2 | 3 | 4 |
| No Additive | ○ | ○ | X | X | X |
| 2% example 7 | ○ | ○ | ○ | ○ | X |

Experiment 7—Yellowing Test

Figure 4:
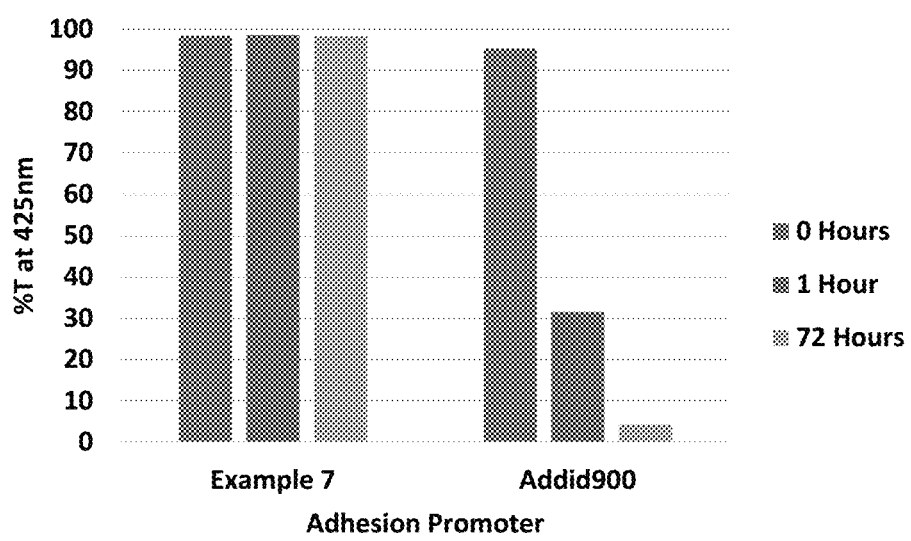
FIG. 4 depicts results from experiment 7.
Figure 5:
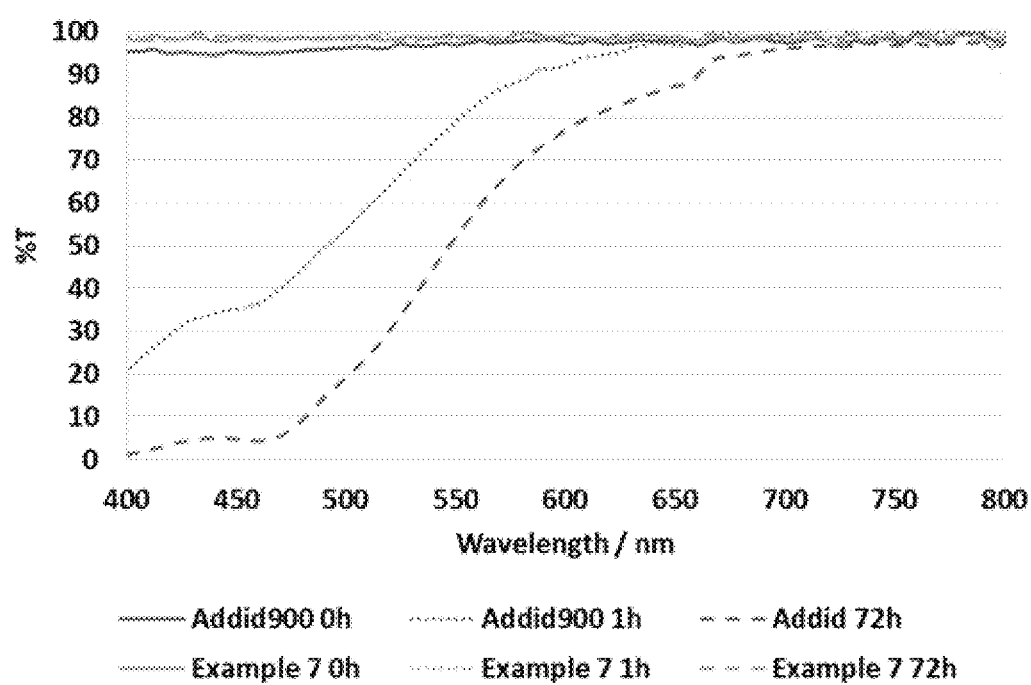
FIG. 5 depicts results from experiment 7.

The adhesion promoter example 7 is dissolved in solvent (2:1 MEK/Cyclopentanone) in the absence of RMs to determine any yellowing over time as is the problem with aminosilane adhesion promoters. In this case the UV-vis spectrum is recorded over time spent in a 70° C. oven for an accelerated aging test. The solvent system is also subjected to the test in a separate bottle; this is then used as the baseline in the UV-vis measurement to rule out any effect of the solvent yellowing over time in the oven. The results of this experiment are shown in Table 12 and FIGS. 4 and 5:

TABLE 12

| Adhesion Promoter | % T at 425 nm After Oven Test | | |
|---|---|---|---|
| | 0 Hours | 1 Hour | 72 Hours |
| Example 7 | 98.4 | 98.6 | 98.2 |
| Addid900 | 95.3 | 31.6 | 4.3 |

The invention claimed is:

1. A polymer comprising one or more repeating units A and/or B,

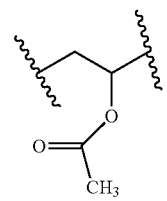

A

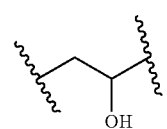

B and one or more repeating units C and/or D,

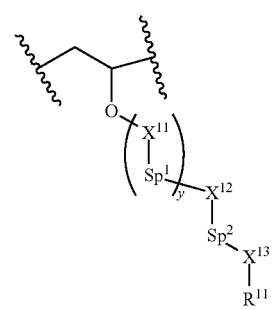

C

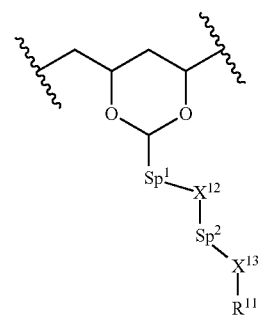

D wherein
(a) Sp$^1$ represents a first spacer group comprising a carbyl or hydrocarbyl group;
(b) X$^{11}$ represents a CH$_2$, CO, —S—CO or —NH—CO— moiety;
(c) y stands for 0 or an integer from 1 to 10, in which Sp$^1$ is defined as above, but independently of each other in each occurrence and X$^{11}$ is defined as above but independently of each other in each occurrence;
(d) X$^{12}$ stands for CO, O, N, S or an ester group;
(e) Sp$^2$ represents a second spacer group comprising a carbyl or hydrocarbyl group;
(f) X$^{13}$ represents O, N or S;
(g) R$^{11}$ stands for a polymerizable group.

2. A polymerisable LC material comprising one or more polymerisable mesogenic compounds and at least one polymer according to claim 1.

3. The polymerisable LC material according to claim 2, wherein the at least one polymer has a molecular weight of about 5,000 to about 205,000 g/mol.

4. The polymerisable LC material according to claim 2, wherein in the at least one polymer the amount of the repeating unit A in the polymer as a whole is in the range from 0 mol.-% to 80 mol.-%, wherein in case the amount of the repeating unit A in the polymer as a whole is 0 mol.-%, then repeating unit B in the polymer is present.

5. The polymerisable LC material according to claim 2, wherein in the at least one polymer the amount of the repeating unit B in the polymer as a whole is in the range from 1 mol.-% to 90 mol.-%.

6. The polymerisable LC material according to claim 2, wherein in the at least one polymer the amount of the repeating unit C in the polymer as a whole is in the range from 10 mol.-% to 80 mol.-%.

7. The polymerisable LC material according to claim 2, wherein in the at least one polymer the amount of the repeating unit D in the polymer as a whole is in the range from 10 mol.-% to 80 mol.-%.

8. The polymerisable LC material according to claim 2, wherein in the at least one polymer the groups A to N correspond to the side chain of the repeating units C in the polymer, which is defined as $$R^{11}\text{—}X^{13}\text{-Sp}_2\text{-}X^{12}\text{-}(X^{11}\text{-sp}^1)_y\text{-}**$$

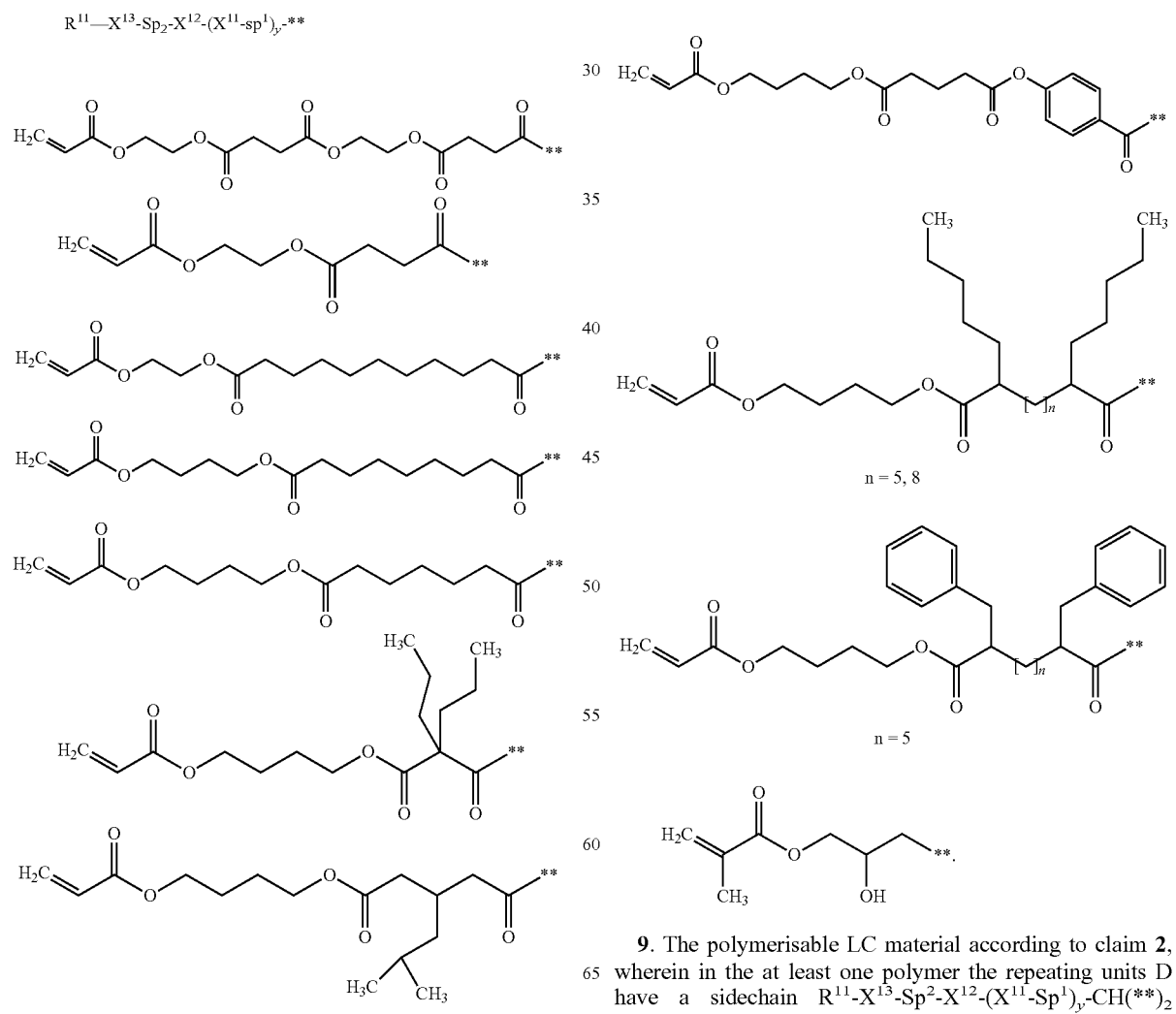

9. The polymerisable LC material according to claim 2, wherein in the at least one polymer the repeating units D have a sidechain $R^{11}\text{-}X^{13}\text{-Sp}^2\text{-}X^{12}\text{-}(X^{11}\text{-Sp}^1)_y\text{-CH}(**)_2$ according to group O,

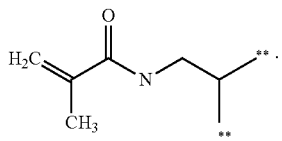

10. The polymerisable LC material according to claim 2, wherein the at least one polymer comprises one or more of the repeating units A and/or B and one or more repeating units C and no repeating unit D.

11. A method for promoting adhesion of two immiscible compounds, comprising achieving said adhesion promotion by the polymer according to claim 1.

12. The polymerisable LC material according to claim 11, in which the polymerisable mesogenic compounds are selected from one or more mono-, di- and/or multireactive polymerisable mesogenic compounds.

13. A polymer film obtainable from the polymerisable LC material according to claim 2 by a process comprising the steps
providing a layer of the polymerisable LC material onto a substrate,
polymerising the polymerisable LC material, and
optionally, removing the polymerised LC material from the substrate and/or optionally providing it onto another substrate.

14. A method of increasing the adhesion of a polymer film, which is obtainable from a polymerisable LC material, to a substrate, film or surface, by adding at least one polymer according to claim 1 to the polymerisable LC material before polymerisation.

15. An optical, electro optical, information storage, decorative or security application, crystal display, OLED display, 3D display, projection system, polariser, compensator, alignment layer, circular polariser, colour filter, decorative image, liquid crystal pigment, reflective film with spatially varying reflection colours, multicolour image, non-forgeable document, identity car, credit card, or banknote, comprising the polymerisable LC material according to claim 2.

16. An optical component or device, polariser, patterned retarder, compensator, alignment layer, circular polariser, colour filter, decorative image, liquid crystal lens, liquid crystal pigment, reflective film with spatially varying reflection colours, multicolour image for decorative or information storage, comprising the polymerisable LC material according to claim 2.

17. The polymer according to claim 1, which comprises at least one repeating unit of A and at least one repeating unit B, and at least one repeating unit C and at least one repeating unit D.

18. An optical, electro optical, information storage, decorative or security application, liquid crystal display, OLED display, 3D display, projection system, polariser, compensator, alignment layer, circular polariser, colour filter, decorative image, liquid crystal pigment, reflective film with spatially varying reflection colour, multicolour image, non-forgeable document, identity card, credit card, or banknote, comprising the polymer film obtainable from said polymerisable LC material according to claim 13.

19. An optical component or device, polariser, patterned retarder, compensator, alignment layer, circular polariser, colour filter, decorative image, liquid crystal lens, liquid crystal pigment, reflective film with spatially varying reflection colours, multicolour image for decorative or information storage, comprising the polymer film obtainable from said polymerisable LC material according to claim 13.

20. The polymer according to claim 1, wherein
$Sp^1$ represents a first spacer group consisting of a carbyl or hydrocarbyl group; and/or
$Sp^2$ represents a second spacer group consisting of a carbyl or hydrocarbyl group.

* * * * *